(12) United States Patent  (10) Patent No.: US 6,243,399 B1
Kaewell et al.  (45) Date of Patent: Jun. 5, 2001

(54) RING SIGNAL GENERATOR

(75) Inventors: John Kaewell, Jamison; Joseph Mark Smith, Royersford, both of PA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 08/788,411

(22) Filed: Jan. 27, 1997

Related U.S. Application Data

(63) Continuation-in-part of application No. 08/624,703, filed on Mar. 26, 1996, now Pat. No. 5,666,355, which is a continuation of application No. 08/278,471, filed on Jul. 21, 1994, now abandoned.

(51) Int. Cl.[7] ....................................................... H04J 3/06
(52) U.S. Cl. ........................................... 370/525; 375/364
(58) Field of Search ..................................... 370/311, 525, 370/526, 480, 343, 344, 503, 276, 280, 281, 294, 295, 321, 337, 338, 347, 350, 442, 518, 520, 403, 404, 405, 499, 498; 379/373, 351, 379, 252, 253, 382, 418; 455/343; 375/261, 297, 298, 354, 355, 356, 357, 359, 362, 364

(56) References Cited

U.S. PATENT DOCUMENTS

| | | | |
|---|---|---|---|
| 3,978,292 | * 8/1976 | Hill et al. ............................... | 379/252 |
| 4,130,731 | 12/1978 | Bolgiano et al. ................... | 179/2 EB |
| 4,239,941 | * 12/1980 | Gauthier et al. ...................... | 379/418 |

(List continued on next page.)

FOREIGN PATENT DOCUMENTS

| | | |
|---|---|---|
| 6272238 | 4/1987 | (JP). |
| 4278757 | 10/1992 | (JP). |
| 4315320 | 11/1992 | (JP). |
| 5316059 | 11/1993 | (JP). |

(List continued on next page.)

OTHER PUBLICATIONS

European Search Report dated Nov. 19, 1997.
"FUJITU", vol. 45, No. 2 (Mar. 1994 issue), Fujitsu Ltd., Mar. 10, 1994, pp. 129 to 136.

(List continued on next page.)

*Primary Examiner*—Dang Ton
(74) *Attorney, Agent, or Firm*—Volpe and Koenig, P.C.

(57) ABSTRACT

A subscriber unit of a time division multiple access (TDMA) radiotelephone system is, from a power consumption standpoint, reconfigured in each time slot of a TDMA frame to a power consumption tessellation in which subscriber unit circuit components not needed for communication signal processing in that time slot are powered down, and other components are powered up.

Some circuit components are powered down by switching their power supply circuits. In order to minimize the extent of circuitry that must be provided to distribute power consumption control signals, other techniques (which utilize circuitry provided for other purposes), such as clock frequency control or power down commands, also are utilized to modify controlled circuit component power consumption without actually controlling power supply circuits. Loop connection length between the subscriber unit and the subscriber's telephone set, or other terminal equipment, is limited to a length which is much less than the length of a radio link on which the subscriber unit operates. Programmable ring frequency logic controls the frequency of a ringing signal generator, and a high frequency ring control signal is switched on and off in the cadence of ringing operation. Also an expansion header is provided to enable serving plural subscriber loop circuits with the same radio equipment for reducing per line power consumption.

18 Claims, 12 Drawing Sheets

U.S. PATENT DOCUMENTS

| | | | |
|---|---|---|---|
| 4,272,650 | 6/1981 | Bolgiano et al. | 179/77 |
| 4,273,964 | 6/1981 | Szpindel | 379/418 |
| 4,365,116 * | 12/1982 | Pira et al. | 379/373 |
| 4,436,960 * | 3/1984 | Harmon, Jr. | 379/373 |
| 4,477,697 | 10/1984 | Judd et al. | 379/375 |
| 4,509,199 | 4/1985 | Ichihara | 455/7 |
| 4,577,315 | 3/1986 | Otsuka | 370/95 |
| 4,584,576 | 4/1986 | Forestier et al. | 379/27 |
| 4,631,361 * | 12/1986 | Millller | 379/351 |
| 4,675,863 | 6/1987 | Paneth et al. | 370/50 |
| 4,713,809 | 12/1987 | Mizota | 370/97 |
| 4,777,633 | 10/1988 | Fletcher et al. | 370/50 |
| 4,794,649 | 12/1988 | Fujiwara | 455/343 |
| 4,866,766 * | 9/1989 | Mitzlaff | 379/374 |
| 4,924,511 * | 5/1990 | Burns et al. | 379/418 |
| 4,962,527 | 10/1990 | Burns et al. | 379/418 |
| 4,964,121 | 10/1990 | Moore | 370/100.1 |
| 5,008,900 | 4/1991 | Critchlow et al. | 375/8 |
| 5,193,211 | 3/1993 | Nobusawa | 455/38 |
| 5,193,212 | 3/1993 | Son | 455/38.3 |
| 5,203,020 | 4/1993 | Sato et al. | 455/68 |
| 5,241,542 | 8/1993 | Natarajan et al. | 370/95.3 |
| 5,278,831 | 1/1994 | Mabay et al. | 370/95.1 |
| 5,280,644 | 1/1994 | Vannatta et al. | 455/265 |
| 5,371,734 | 12/1994 | Fischer | 370/95.1 |
| 5,392,287 | 2/1995 | Tiedemann, Jr. et al. | 370/95.1 |
| 5,594,737 | 1/1997 | Pillekamp | 370/278 |
| 5,666,355 * | 9/1997 | Huah et al. | 370/311 |

FOREIGN PATENT DOCUMENTS

| | | |
|---|---|---|
| 697993 | 4/1994 | (JP) . |
| 7202789 | 8/1995 | (JP) . |
| 7321694 | 12/1995 | (JP) . |
| 819041 | 1/1996 | (JP) . |
| WO 94/10812 | 5/1994 | (WO) . |

OTHER PUBLICATIONS

Japanese Patent Office Examination Report dated Feb. 22, 2000 for Japanese Patent Application No. 8–505808 and translation of same.

Ultraphone PROD 3 Schematic Diagram, Drawing No. BE80002, Sheet 10 of 16, InterDigital Communications Corporation, May 20, 1992.

AMD SLIC Application Note AM79M53X/AM7957X, Advanced Micro Devices, Nov. 1991.

Multiple–Line–Subscriber Quad–Line Module (QLM) Schematic, Nexus Applied Research, Inc., Nov. 5, 1993.

D.M. Beaupre, "Five Years of IDMA Subscriber Radio", pp. 375–379, IEE International Conference on Communications ICC '83, Jun. 19–22, 1983, Boston, MA.

D.M. Beaupre et al., "A New Point to Multipoint Microwave Radio System", pp. 47–51, 6th International Symposium on Subscriber Loops and Services (ISSLS 84), Nice, Oct. 1–5 1984.

* cited by examiner

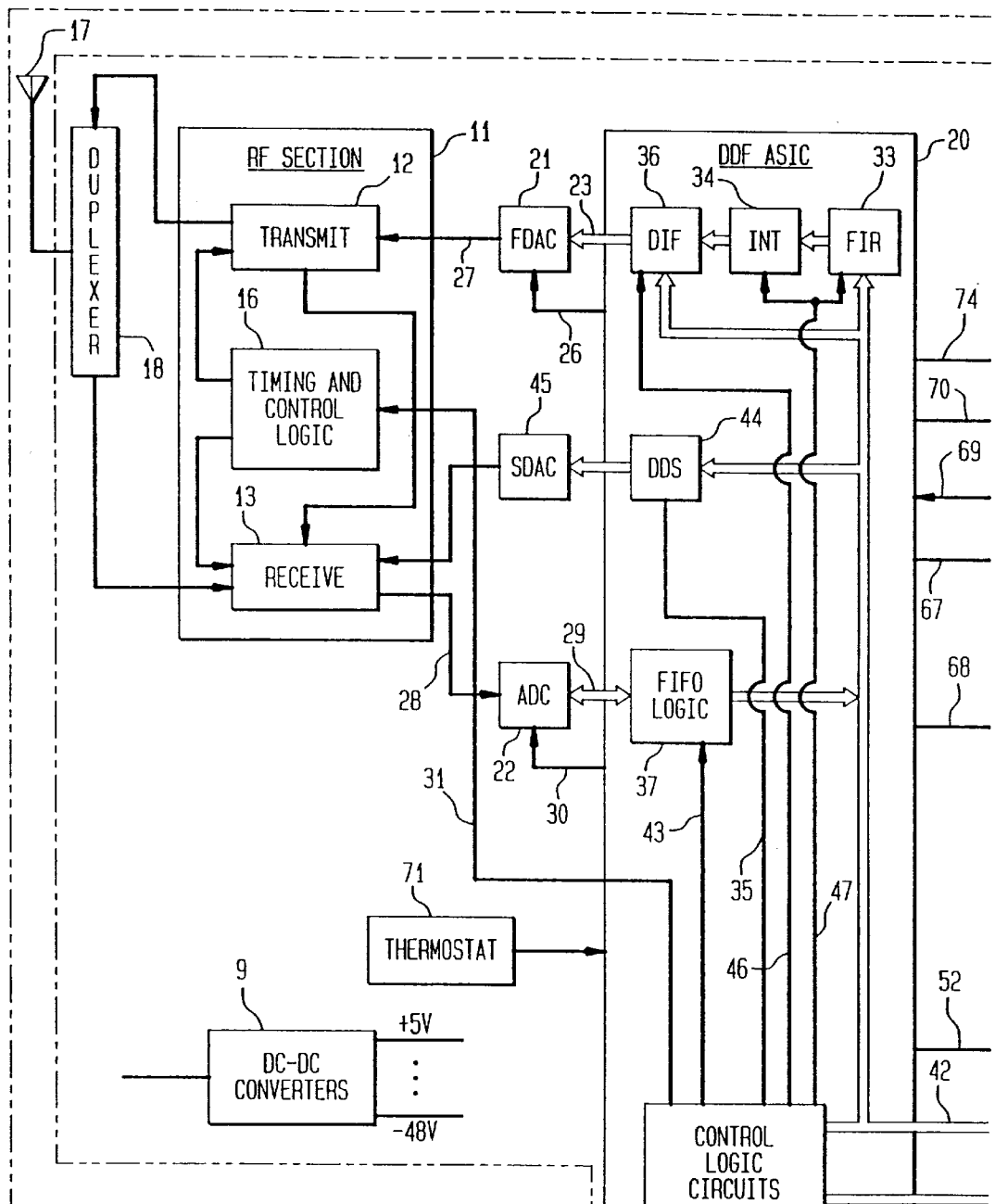
FIG. 1A
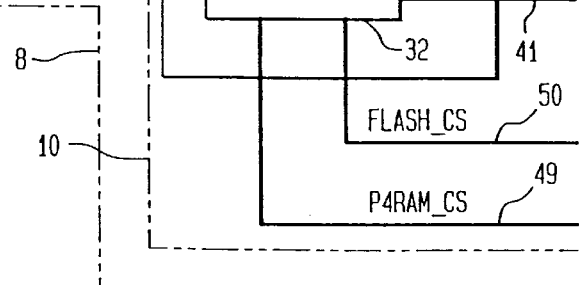

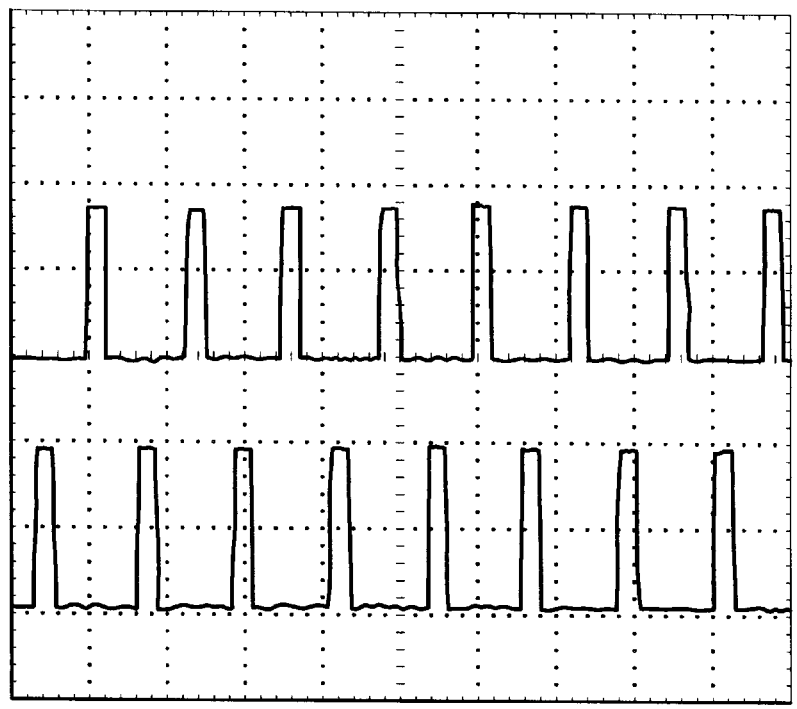

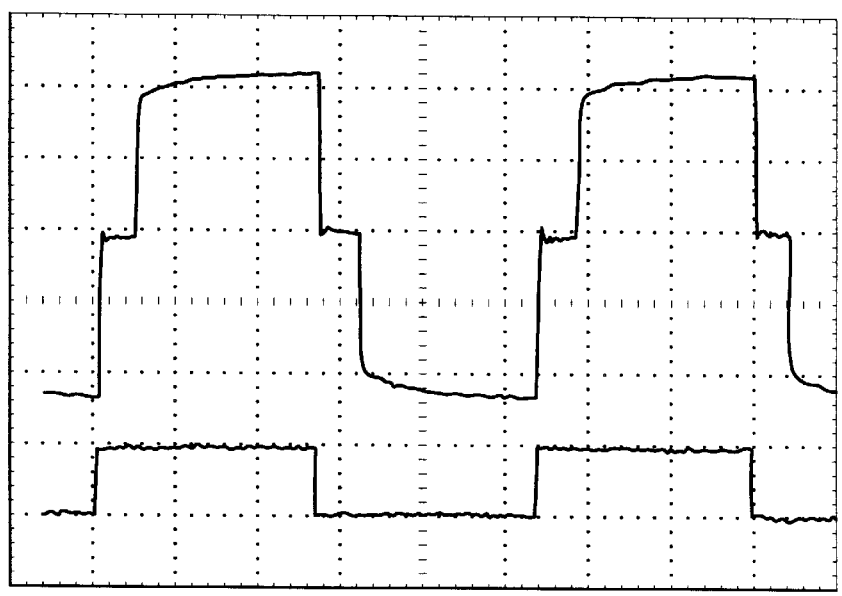

RING SIGNAL GENERATOR

This application is a continuation-in-part of Ser. No. 08/624,703, filed Mar. 26, 1996 now U.S. Pat. No. 5,666,355 which is a continuation of Ser. No. 08/278,471, filed Jul. 21, 1994 (abandoned).

This invention relates to a communication system station power consumption control method and apparatus in which control is exercised to different degrees in the different states of operation of the station.

BACKGROUND OF THE INVENTION

There has long been a strong interest in containing electric power consumption in electronic circuits which may depend upon limited power sources such as batteries or solar panels. Interest has been particularly acute for radiotelephone system stations that are either portable or located in a geographical area not adequately served by electric power distribution facilities. Such a station is herein usually called a subscriber station unit, or simply a subscriber unit. This interest has become even more sharply focused as concerns have grown about the need to contain pollution of various kinds.

In the radiotelephone field several types of efforts have been made to limit power consumption. Voice operated transmitters (VOX) are well-known wherein the presence or absence of an actual voice signal turns a transmitter power supply ON or OFF, and one example is the D. R. Bolgiano et al. U.S. Pat. No. 4,130,731. Otherwise a subscriber unit including such a transmitter is fully powered during all states of operation. A number of power conservation efforts have resorted to periodically enabling at least the receiving circuits of a subscriber unit while the unit is in a standby mode awaiting the availability of a channel or awaiting initiation of a call, and some examples are the U.S. Pat. No. 4,272,650 to D. R. Bolgiano et al., and U.S. Pat. No. 5,203,020 to H. Sato et al. Subscriber unit circuits in these latter systems are otherwise fully powered during actual call signal processing.

The term "call signal processing" refers to operations such as, e.g., amplification, filtering, encoding/decoding, interpolating, or modulating with respect to signals of any type for communication between stations.

In the Sato et al. patent, when a subscriber unit in a mobile telecommunication system is in a location where it is unable to be served on any channels of the system, it is powered up periodically to check for the availability of an appropriate channel; and otherwise all components except a timer are powered down. When an available channel has been found, and while awaiting the start of a call, the central processing unit (CPU) and a timer are continuously powered up while the remainder of the unit is periodically powered up to check for the start of a call. Finally, during a call connection, the entire subscriber unit is continuously powered up.

In another group of systems, subscriber units are powered up or down as a group and special arrangements are provided to power up a subscriber unit if necessary when others are powered down. Some examples include U.S. Pat. No. 4,964,121 to M. A. Moore, U.S. Pat. No. 4,509,199 to M. Ichihara, and U.S. Pat. No. 4,577,315 to S. Otsuka. Similarly, in U.S. Pat. No. 4,713,809 to Y. Mizota, a relay station for a time division multiple access (TDMA) system is powered up in only those TDMA time slots in which a subscriber unit served by it is active.

Subscriber units for radiotelephone systems, such as the subscriber unit of the U.S. Pat. No. 5,008,900 to D. N. Critchlow et al., have included means for powering down a certain relatively high power consumption component at a selected time determined by the subscriber unit function being performed at such time. For example, in that Critchlow et al. patent a processor chip, included in the unit for controlling the various unit components as well as performing certain signal processing functions, is temporarily powered down when there is no phone call in progress. The powering down occurs in response to execution of an idle instruction in the unit's program of operation. Normal operation is temporarily resumed in response to an interrupt signal, and if there is no service routine to be performed the processor returns to the powered down state. Otherwise the subscriber unit components appear to be fully powered.

In the U.S. Pat. No. 4,675,863 to E. Paneth et al. a modem is operated in a half-duplex mode in a subscriber unit that functions in a TDMA environment. In that mode, the receiving demodulation section and the transmitting modulation section of the modem operate at different times; so the radio frequency (RF) section power amplifier is active for no more than half of the time. Other subscriber unit components appear to operate continuously.

Subscriber units in relatively difficult to reach locations often are equipped with a backup power supply using batteries supported by solar panels or an alternating current charger. In spite of efforts of the type described above, some subscriber units in wireless TDMA communication systems, which have the capability of being operated by backup battery power with appropriate charging facility, have had to use multiple backup batteries to supply the needed power. In some such units a pair of 15 ampere-hour 12-volt batteries and a charging source of four to six solar panels have been employed.

SUMMARY OF THE INVENTION

In accordance with the present invention, certain circuit components of a TDMA radiotelephone system subscriber unit are recurrently powered down during a call connection. The portions powered down during different time slots of each recurring TDMA time frame are not required for signal processing operation in the respective time slots of the frame. In other words, there is a changing tessellation of subscriber unit active circuit portions that are powered up and powered down from time slot to time slot to limit dynamically the power consumption of the unit.

According to one aspect of the invention, the need for special circuits to distribute power consumption control signals is reduced by employing existing control or call signal paths, where appropriate, to distribute power consumption control commands. Several control implementation techniques are employed for reducing the need for specialized power consumption control circuitry. Those techniques include, illustratively, controllably switching the power supply current path to a circuit component, or remotely controlling the frequency of a clock source output to certain clocked circuit components which are implemented in a semiconductor technology in which power consumption is affected by clocking rate, or reducing input signal to a circuit which consumes less power when responding to little or no input signal, or reducing bias current supplied to an amplifier, or distributing command signals to commercially available circuit components which are normally provided with a power down input connection.

In one embodiment, the subscriber unit circuitry includes a line interface unit to couple the subscriber unit signal processing circuit components to a subscriber communication instrument such as a telephone station set. The subscriber unit also includes, on a single circuit board along with the line interface unit and other subscriber unit circuit components, an expansion slot; or header connector, to provide line interfacing functions for additional services of the same or different types to share utilization of the subscriber unit circuits.

A subscriber unit in accordance with the invention operates in a TDMA system which includes a network station that provides a radio control channel (RCC) for communicating with activated subscriber units that are not engaged in a call connection. The subscriber unit utilizes the TDMA system time slots and frame clocking arrangements for periodically powering up primarily only those circuit components needed to sample the RCC to determine whether or not there is call traffic for the unit. In one embodiment, no more than one time slot per TDMA frame is utilized for that purpose on the RCC channel. In some applications, it is possible further to utilize only one time slot in every second, or less frequently occurring, frame.

Additional power is conserved by limiting the subscriber loop circuit between the serving subscriber unit and any served subscriber communication instrument (e.g., a telephone set) to a loop length which is substantially less than the length of a radio link to a base station to which the subscriber unit couples the loop circuit.

Also, a conveniently controlled ring generator is employed in which a ringing frequency is digitally programmable, and ringing on-off cadence and power consumption are controlled by a binary level signal.

Power consumption level control in the subscriber unit is disabled and enabled under the control of a thermostat within the subscriber unit case to help maintain a predetermined minimum temperature within the case.

BRIEF DESCRIPTION OF THE DRAWINGS

A more complete understanding of the invention and its various features, objects, and advantages may be obtained from a consideration of the following Detailed Description and the appended claims together with the accompanying drawings in which:

FIGS. 1A and 1B, taken together as shown in FIG. 1C, are a block and line diagram of a subscriber unit in accordance with the present invention; and they are designated simply "FIG. 1" when referring to the entire subscriber unit;

FIGS. 13(a) and (b) and FIGS. 14(a) and (b) illustrate waveforms associated with the circuitry shown in FIG. 12.

DEFINITIONS OF ABBREVIATIONS AND ACRONYMS

Figure 1B:
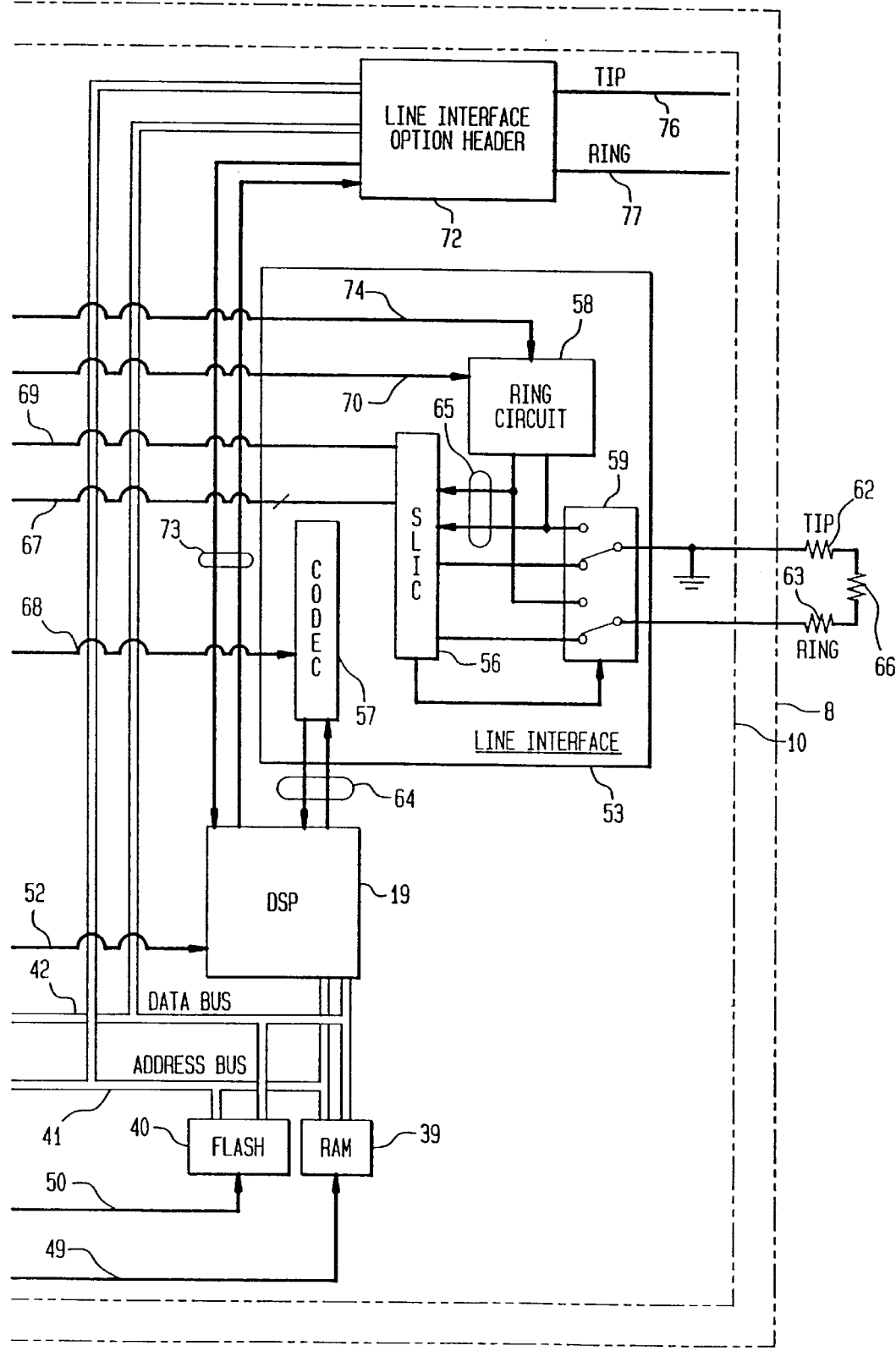

AC: Alternating Current
ADC: Analog to Digital Converter
AGC: Automatic Gain Control
ASIC: Application-Specific Integrated Circuit
CMOS: Complementary Metal Oxide Semiconductor
CODEC: Coder/decoder
CODECPD: CODEC Power Down signal
CPU: Central Processing Unit
DAC: Digital to Analog Converter
DC: Direct Current
DDF: ASIC for performing DIF, DDS, and FIR functions
DDS: Direct Digital Synthesis
DIF: Digital IF
DIFCLK: Digital Intermediate Frequency Clock
DSP: Digital Signal Processor
FDAC: DAC for DIF output
FIFO: First In First Out (queue) memory
FIR: Finite Impulse Response filtering
FLASH RAM: Electrically -programmable non-volatile RAM
FLASH_CS; FLASH Chip-Select signal
IF: Intermediate Frequency
IFLPBK: Intermediate Frequency Loopback
INT: Interpolator
LSB: Least Significant Bit
Ms: millisecond
MSB: Most Significant Bit
P4RAM_CS: Pin-4 RAM chip-select signal
PAEN: Power Amplifier Enable
PNP: Junction transistor having p-, n-, and p-type conductivity material layers
PROM: Programmable Read Only Memory
PROM_CS: PROM Chip-Select signal
PSK: Phase Shift Keying (modulation technique)
QPSK: Quadrature Phase Shift Keying (modulation technique)
RAM: Random Access Memory
RCC: Radio Control Channel
RF: Radio Frequency
Rx: Receive
SDAC: DAC for output of DDS
SLIC: Subscriber Line Interface Circuit
SLAC: Subscriber Loop Audio Circuit
TDMA: Time Division Multiple Access
T/R: Transmit or Receive
Tx: Transmit
VAGC: Voltage for AGC
VOX: Voice Operated Transmission.

DETAILED DESCRIPTION

For convenience of illustration, and without limitation, the invention is here described with reference to a TDMA communication system subscriber unit. The drawing representations of such unit are simplified to show the power conservation aspects, the underlying radiotelephone signal processing aspects being known from such prior work as the Paneth et al. and Critchlow et al. patents referenced above. The disclosures of those two patents are incorporated herein by reference. However, the invention is applicable to TDMA radiotelephone systems without limitation to a particular system design. Discussion of radiotelephone signal processing aspects is included here only to the extent necessary to facilitate an understanding of the power conservation aspects of the invention.

In FIG. 1, is shown a subscriber terminal 8 including a subscriber unit 10, of the type illustrated in Critchlow et al., for a TDMA communication system such as that illustrated in Paneth et al. Operating power for the circuit components of the unit 10 is supplied from a battery (not shown) or solar panels (not shown) or an AC to DC power supply (not shown), by way of a set of prior art DC/DC converters 9. The converters of set 9 produce various output voltages required for the circuit components of unit 10, and a range of voltages including +5 volts and −48 volts is illustratively indicated in the drawing. The various voltages are coupled to those subscriber unit circuit components in the usual way by circuits which are not shown in FIG. 1.

Circuit components of subscriber unit 10 include both active and passive components. Among the active circuit components is a group in which each component has at least one power-consumption-effectual electrical input connection at which a predetermined change in the electrical input causes a corresponding change in the power consumption level of the circuit component. In accordance with the invention, those power-consumption-sensitive input connections are controlled in each TDMA system time slot to power up those of the group components needed for signal processing and power down remaining components of the group.

The subscriber unit 10 of FIG. 1 includes an RF section 11 having a transmit portion 12, a receive portion 13, and a timing and control logic circuit 16. An antenna 17 provides coupling via a radio link to a TDMA system base station (not shown) and is in turn coupled by way of a duplexer 18 to the transmit and receive portions of RF section 11. The subscriber unit 10 is operated under the control of a digital signal processor (DSP) 19, i.e., a programmed central processor. One suitable integrated circuit chip for the DSP 19 is the TMS320C52 DSP of the Texas Instruments Corp. A DDF application-specific integrated circuit (ASIC) 20 is bidirectionally coupled with the RF section 11 by a DIF-fed digital to analog converter (FDAC) 21 (such as the CXD1171M DAC of the Sony Corp.) and an analog to digital converter (ADC) 22 (such as the AD7776 of the Analog Devices Corp.). A bit-parallel bus 23 and a DIFCLK connection 26 couple digital modulation voice data and a clock signal, respectively, from DDF ASIC 20 to the FDAC 21. The DIFCLK circuit signal clocks the FDAC 21; and, during TDMA time slots when FDAC operation is not required, DIFCLK is turned off to reduce power consumption. To that end, FDAC 21 is advantageously configured using a semiconductor technology in which power consumption is affected by clocking rate. One example of such a technology is complementary metal oxide semiconductor (CMOS) technology. In CMOS circuitry, the current drawn is dependent upon the rate at which the included CMOS devices switch; so if the clocking signal is interrupted, switching stops; and a significant power consumption reduction results. A similar effect results in CMOS circuit components which are not clocked when their input signals are prevented from changing, and thereby prevent the CMOS transistors from switching. Analog IF signals are applied from the FDAC 21 output to the transmit portion 12 of the RF section 11 by a circuit 27.

Similarly, received analog IF signals are coupled from the receive portion 13 to the ADC 22 by a circuit 23, and the digital output of the ADC is applied to the DDF ASIC 20 by a bit-parallel bidirectional circuit 29. That circuit 29 is also employed to apply power consumption control signals, and other control signals, to ADC 22 from the DDF ASIC 20, as will be subsequently described. A circuit 30 couples several further control signals to the ADC 22 from the DDF ASIC 20.

Power consumption control signals, as well as other timing and control signals, are applied to the RF section 11 timing and control logic 16 from the DDF ASIC 20 by a circuit 31. That circuit 31 will be further discussed in connection with FIG. 2, but for present purposes it is noted that it comprises four circuits for signals used to implement power consumption control in the RF section 11. Those four signals are Tx (to turn the transmit portion 12 ON and OFF), Rx (to turn the receive portion 13 ON and OFF), PAEN (to enable or disable a power amplifier 101 in the transmit portion 12), and IFLPBK (to control a loopback switch in the receive portion 13). A supplemental digital to analog conversion function (not shown in FIG. 1) is associated with an automatic gain control function in the receive portion 13, to be discussed in connection with FIG. 2. That supplemental digital to analog conversion function is considered to be included in the schematic representation of receive portion 13.

The DDF ASIC 20 includes circuit components which are parts of both the baseband and the intermediate frequency portions of subscriber unit 10 as well as circuitry for performing the various signal processing and control functions necessary to enable cooperation among the RF section 11, converters 21 and 22, the DSP 19, and the baseband circuit components not yet mentioned. Of specific interest in connection with the present invention are the power consumption control aspects to be described. To that end, DDF ASIC 20 includes control logic circuits 32 which supervise register-based communications among the components of DDF ASIC 20 and other components of the subscriber unit 10. For example, information from a source circuit, e.g., a data bus 42, is loaded into a DDF ASIC register at one clock time and then read out to its destination circuit at a later clock time. The circuit components of logic circuits 32 are not themselves powered down at any time when the subscriber unit is activated. Also in the DDF ASIC 20, and of interest for power consumption control purposes are an FIR section 33 of the ASIC for filtering the digital modulation signal to be transmitted, an interpolator (INT) section 34 for increasing the symbol rate of that digital signal, a DIF section 36 for performing phase modulation and first mixing to bring the baseband digital signal up to a first intermediate frequency, and a receive FIFO logic circuit 37 for performing several functions as will be described in connection with FIG. 7.

Various signal processing functions in the subscriber unit 10 require different signal frequencies for, e.g., clock frequencies, local oscillator frequencies, and reference frequencies, for both transmit and receive operations, as is well known in the art. The process of producing those frequencies advantageously involves direct digital synthesis (DDS) functions, also as known in the art. In the embodiment of FIG. 1, the DIF section 36 advantageously performs the DDS function for subscriber unit circuit components involved in only transmitting operations. In addition, a separate DDS section 44 performs the DDS function for subscriber unit circuit components that are involved in primarily only receive operations. Output of the DDS 44 is coupled via a DDS-fed DAC (SDAC) 45 to the receive portion 13 of RF section 11. Since at least one circuit component, to be described, of the receive portion has such long time constants that it must be powered up at all operating times, the DDS also is powered up during all operating times (vis-a-vis initializing).

Control logic circuits 32 respond to address and data signals received from the DSP 19 and its associated memories (i.e., a RAM 39 and a FLASH RAM 40) by way of an address bus 41 and a data bus 42 to effect the aforementioned control. Information received in that way by circuits 32 informs them of the operating state of the subscriber terminal 8 (e.g., initiating operation, resetting circuit parameters, idle (on-hook) while awaiting initiation of a call, ringing, and transmit/receive (off-hook) operation during a call). Data indicating the mode of operation (e.g., QPSK or 16PSK) also is provided. Control logic circuits 32 include registers for communication with data and address buses 42 and 41 and other circuit components of subscriber unit 10. Hence came the prior characterization of communication among circuits 32 and other components of subscriber unit 10 as being register-based. This type of communication is well-known in the art. However, in FIG. 1 those buses are shown as extending directly to the block representing circuits 32. In most cases other circuits are shown simply extending to or from the edge of DDF ASIC 20. Illustrative portions of circuits 32 involved in time-slot-based power consumption control will be discussed in greater detail in FIGS. 7–10.

Control logic circuits 32 utilize information received from buses 41 and 42 and other circuits, together with time slot and frame information also generated in circuits 32, to develop necessary additional signals for coordinated control of the various components of the subscriber unit 10. Those additional signals include certain power consumption control signals for the unit 10. The latter signals include the four previously listed signals conveyed by circuit 31 to the RF section 11. In addition, a circuit 43 couples a multibit command signal from logic circuits 32 to FIFO logic 37, and that signal includes a power consumption level control bit for communication to the ADC 22 at the beginning and end of a receive time slot, as will be described in connection with FIG. 7. FIFO logic circuit 37 is itself continuously powered up whenever the subscriber unit 10 is activated.

Control logic circuits 32 supply clock signals to circuit components of the DDF ASIC 20. A circuit 35 couples continuous clock signals to the DDS 44. A circuit 46 couples selected, i.e., programmably interruptible, clock signals to the DIF section 36, and a circuit 47 couples other selected clock signals to both the INT section 34 and the FIR section 33, as will be described in connection with FIG. 8. By turning clock signals on circuits 46 and 47 on and off in appropriate time slots the FIR and INT sections and the DIF section, all of which are advantageously implemented in the CMOS technology, are effectively powered up and down for power consumption control. When CMOS circuitry is not clocked, the CMOS transistors do not switch, and the circuit assures a nearly zero power consumption level.

Logic circuits 32 include address decoding logic (not shown) which is responsive to signals on address bus 41 for developing chip select signals P4RAM_CS and FLASH_CS on correspondingly designated leads 49, and 50, respectively, which enable circuit components including memories RAM 39, and FLASH 40, respectively, to be accessed. The leads 49, and 50 usually are included in address bus 41 but have been separately shown for purposes of illustration of the powering down aspect of the invention. Since those memories also are implemented in CMOS technology, the absence of a select signal to one of them prevents it from being addressed and so effectively powers it down (without losing stored information) until it can once again be selected for addressing.

Before the DSP executes an Idle instruction in its program, in order to power itself down (i.e., go to sleep), it sets a sleep counter (FIG. 9) in the control logic circuits 32 via a memory-mapped register in the DDF ASIC 20 and using the DSP address and data buses 41 and 42. DSP 19 then enables the counter to begin counting in the same manner. Upon expiration of the counting interval, or if the circuits 32 receive a signal indicating that a served subscriber has taken the telephone set off hook, the logic circuits 32 apply to a circuit 52 a WAKEUP non-maskable interrupt (NMI) signal which causes DSP 19 to power up and resume processing. This aspect is further described in connection with FIG. 9.

Subscriber unit 10 includes a line interface unit 53, which in turn includes circuit components that are selectively powered up and down for power consumption control by signals provided from the DDF ASIC 20 logic circuits 32. Principal components of the line interface unit 53 are a prior art subscriber line interface circuit (SLIC) 56, a prior art coder/decoder (CODEC) 57 (sometimes called a subscriber loop audio circuit (SLAC)), a prior art ring circuit 58, and a prior art ring relay 59. Relay 59 is illustrated in its normal position during a call connection, and it connects the circuit 58 to the subscriber loop when activated by a signal from the SLIC 56. The subscriber loop is schematically represented by tip lead and ring lead resistors 30 62 and 63, respectively, and a resistor 66 representing a subscriber communication instrument such as the subscriber telephone set. The subscriber unit is useful for serving various subscriber human interface devices, i.e., communication instruments, such as a telephone set, a modem, or a facsimile machine; but the telephone set is here used for convenience of description.

SLIC 56 provides an electrical interface between the subscriber unit and the subscriber loop, and it is advantageously a circuit which includes a built-in capability to operate with different loop output voltages for different ranges of load (i.e., telephone subscriber loop) resistance. Heretofore in a typical wire-line network application, and using the commercially available SLIC previously identified (AMD 79534), the SLIC output voltage, at 30 milliamperes, to the subscriber loop was approximately 36 volts for a total loop resistance of 1200 ohms, i.e., a loop power consumption of 1.08 watts. Less voltage and less power are needed for lower loop resistances.

On the other hand, applications for a subscriber unit typically involve the mounting of the unit on or very near to a building in which the subscriber telephone set is located, and the subscriber loop between the unit and the telephone set is typically much shorter than is the radio link between the subscriber unit and a base station serving the subscriber unit. Stated differently, the subscriber loop connected to the illustrated subscriber unit is typically much shorter than is the subscriber loop between a telephone exchange and a subscriber's telephone set in a wire line system. In accordance with the present invention, the subscriber loop including resistances 62, 63, and 66 is preferably limited to a much lower total resistance than the typical loop resistance in a wire-line system. Thus, in order to reduce power consumed by the loop its resistance is advantageously limited to about 500 ohms. That represents a maximum power consumption in the loop of about 0.45 watts, without reducing the operating current available to the loop.

The SLIC 56 contains a DC-DC converter which supplies constant loop current to varying loop resistances while consuming a constant power itself, regardless of loop voltage, of approximately 450 milliwatts (mW). Thus, because of the reduced output voltage from the SLIC to serve the shorter loop, and assuming that converters 9 are about 85% efficient, the subscriber unit per se in the foregoing example consumes about 740 mW less total power. Consequently, there is a total power saving which is a significant fraction of the overall average subscriber unit input power requirement.

Transmit signals from the subscriber telephone station set flow through the SLIC 56 and CODEC 57, and (in digital form) via a bi-directional, communication signal, interface circuit 64 to DSP 19. After resampling and other processing functions in DSP 19, the transmit signals continue on through FIR section 33, INT section 34, and DIF section 36 on the DDF ASIC 20 from which they flow through FDAC 21 and the transmit portion 12 of the RF section 11 to the antenna 17. Receive signals intercepted by the antenna 17 flow through the receive portion 13 of section 11, ADC 22, FIFO logic 37, DSP 19, and (via circuit 64) CODEC 57 and SLIC 56 to the subscriber's telephone set. SLIC 56 is provided with input connections 65 tapped off the ring circuit 58 output to enable SLIC 56 to detect a subscriber telephone set off-hook state during ringing (i.e., during the SLIC 56 powered down state). A lead 69 extending from SLIC 56 couples an off-hook-detected signal to the DDF ASIC 20 and its logic circuits 32.

SLIC 56 is advantageously an AM79534 CMOS circuit of Advanced Micro Devices, Inc., and it is switched between an active state and a low power state by a multibit control word provided from the DSP by way of the DDF ASIC 20 (control circuits 32) and a connection 67. CODEC 57 is advantageously an AMD 7901B circuit of Advanced Micro Devices, Inc.; and it is switched between an active state and an off state by a serial multibit SERDAT signal on a lead 68 from logic circuits 32 in DDF ASIC 20.

A circuit 70 illustratively couples an 80 kilohertz (kHz), low voltage, clock signal from DDF ASIC 20 to the ring circuit 58 which generates a high voltage for ringing. A circuit 74 couples a low voltage signal RINGFRQ at a selectable low frequency (illustratively 20 Hz) to ring circuit 58 to generate the ringing signal frequency. The 80 kHz and RINGFRQ signals are stopped (i.e., held at a constant D.C. value) when the telephone instrument is not actually to produce the alerting ring sound, e.g., during the "4 seconds off" of a "2 seconds on, 4 seconds off" ringing cadence. Thus, the ring circuit power consumption control and its operational control are implemented by the same signals. That is, even. when the circuit is in its active ringing state its input signal clock supply is being periodically turned on and off in the mentioned ringing cadence; and that reduces power consumption. This is advantageous because, when active, in one two-second ringing interval the ring circuit consumes as much power as does all the rest of the subscriber unit 10 during about 3.3 seconds of operation in a normal voice call (using 16PSK modulation in half-duplex operation), or 8.3 seconds of idle operation. Relay 59 is activated during ringing to connect tip and ring telephone connections to the ring generator 58 output. That activation is accomplished in the usual way by a SLIC 56 output, which is controlled by a DDF ASIC 20 output, which is in turn controlled with a command, also on circuit 67, from the DSP 19 via DDF ASIC 20.

A prior art line interface option header 72 is also provided on the subscriber unit 10 so that other services can be accommodated within the TDMA time frame structure, to be described, when traffic levels permit. Examples of such services include, illustratively, accommodation for an additional plain telephone subscriber line, or a coin telephone, or a data modem, or a facsimile machine. To that end the header 72 is provided with connections to the address bus 41 and the data bus 42, as well as a bidirectional circuit 73 for communication signal interface coupling with the DSP 19. Power supply connection (not shown in FIG. 1) for a common DC supply voltage, such as 12 volts, from the set of DC/DC converters 9 also is provided. Tip and ring leads 76 and 77 afford communication to the subscriber service equipment to which an insertable service option card (not shown) is adapted. To the extent that such an option card requires a particular range of supply voltages other than the one supplied from converters 9, it will include its own set of DC/DC converters. Similarly, control signals, including those for power consumption control of circuit components on the option card will be provided by way of the data and address buses 42 and 41 to appropriate command interpreting logic on the option card.

When a line interface circuit card is plugged into the header 72 and coupled to a subscriber loop, the subscriber unit may operate in a QPSK full-duplex mode as will be further discussed subsequently. The term "full-duplex" as employed here in TDMA operation has a somewhat different denotation than the traditional denotation. In the TDMA environment, full-duplex operation denotes subscriber unit operation in which both transmit and receive portions of the unit are operating in a single time slot. This permits the more traditional full-duplex telephone operation in which both parties to a call can speak at the same time, as also is the case in TDMA half-duplex operation; but it also permits a single subscriber unit to serve, e.g., two subscriber lines, i.e., dual-line service. In the full-duplex, dual-line service mode of operation, the power consumption of the entire subscriber unit is higher than when serving a single line; but because of the sharing of portions of the subscriber unit which are fully powered at all operating times, there is a lower per-line hardware cost, as well as a lower per-line power consumption, for the subscriber unit.

The power consumption level control capability in subscriber terminal 8 is useful for assisting in the regulation of the terminal internal temperature. To that end, a thermostat 71 would be coupled via DDF ASIC 20 to the data bus 42 so that its open or closed circuit state can be periodically registered in the ASIC and that state read by DSP 19. The thermostat is advantageously set to be actuated to a changed circuit state when temperature within subscriber terminal 8 falls below a predetermined temperature, such as 0° centigrade. When the temperature drops below that level, the changed circuit state of the thermostat causes DSP 19 to hold the power consumption level control signals to circuits which switch actual power supply current circuits, such as control signals supplied on the circuit 31, to their On, or normal, power consumption levels; so no circuit components of the subscriber unit which are so controlled will be powered down until the thermostat 71 is restored to its prior circuit state. Consequently, heat generated by the controlled and fully powered circuit components will tend to restore terminal temperature to a higher level.

Figure 2:
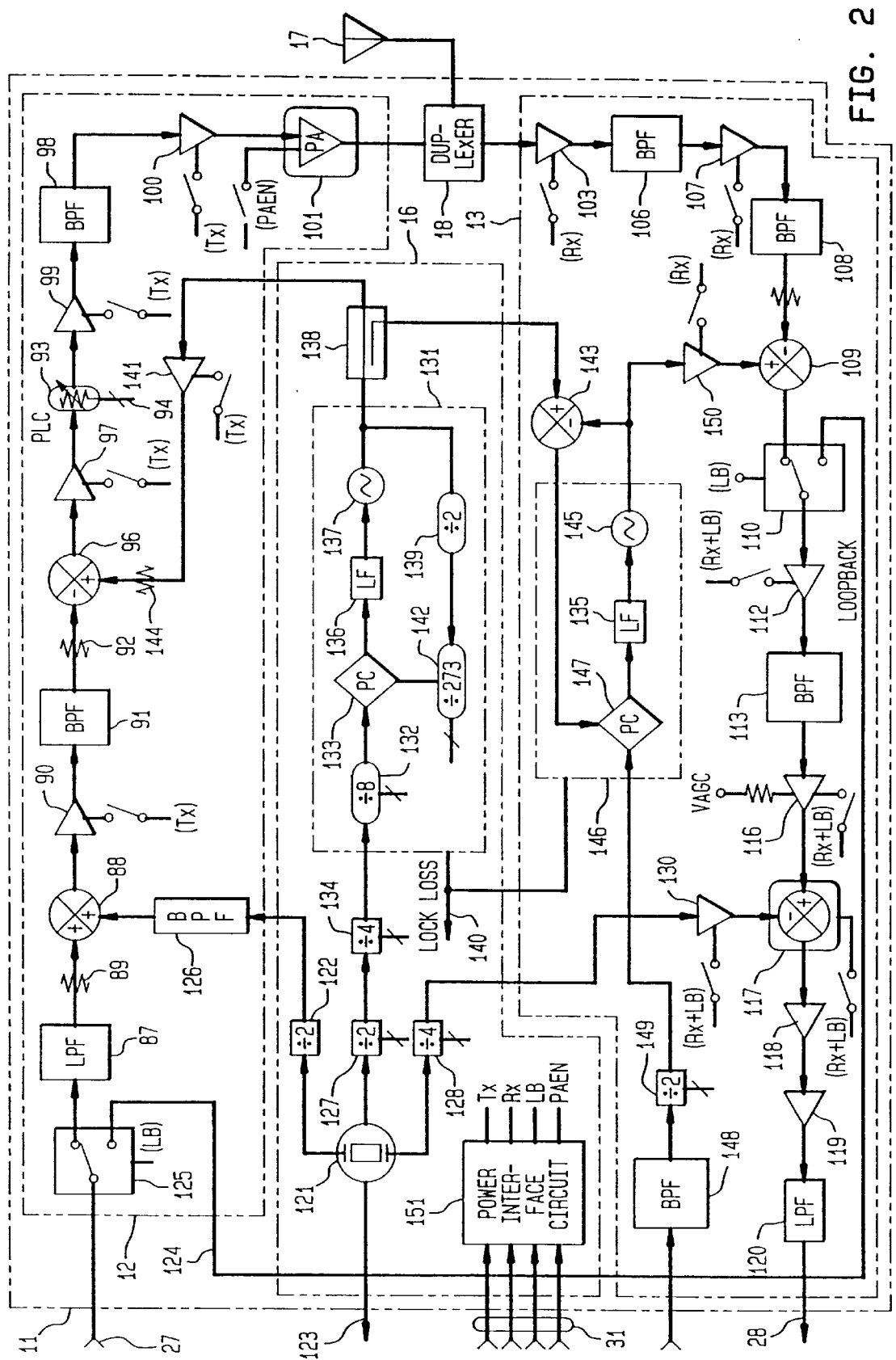
FIG. 2 is a block and line diagram of the radio frequency (RF) section of the subscriber unit of FIG. 1.

Turn now to the FIG. 2 block diagram which illustrates in greater detail the RF section 11 and the resolution level of the power consumption control tessellation, or mosaic, there. Control for many circuit components in FIG. 2 is implemented by the technique of employing a gating switch in the series current path of the power supply circuits for selected circuit components of the section. One example is shown in more detail with respect to an amplifier in FIG. 3.

Figure 3:
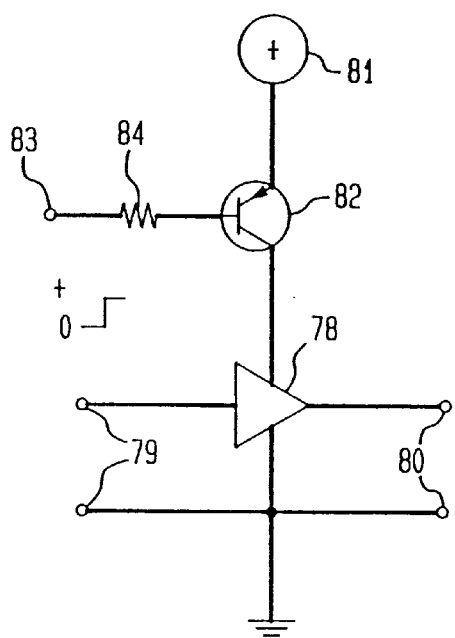
FIG. 3 is a schematic diagram of a power supply, current, powering down, control circuit embodiment.

In FIG. 3, an amplifier 78 receives input signals at terminals 79 and produces amplified output signals at terminals 80. A positive voltage power supply 81 is schematically indicated by a circled plus sign to represent a DC source having its positive terminal connected to the illustrated circuit at the circled plus sign and its negative terminal connected to ground. Supply 81 is connected to the emitter terminal of a PNP transistor 82 having its collector terminal connected to a power supply terminal of amplifier 78, which has its other supply terminal connected to ground. Transistor 82 is biased either for saturated conduction or for nonconduction by a power consumption control signal, i.e., a DC level signal which is either zero or positive, respectively, applied between a terminal 83 and ground across resistor 84 for so biasing the transistor base terminal. In terms of power consumption control, the transistor 82 is connected in series in the current supply path for amplifier 78 and is operated as a switch to turn the amplifier on (transistor 82 in saturated conduction) and off (transistor 82 nonconducting). Use in FIG. 2 of this technique for power consumption control is indicated, for convenience of illustration, by an open switch in series in the power supply path of a controlled circuit component. In practice only three transistor switches (not shown but advantageously included in the schematic representation of RF section 11) are used. Each switch is controlled by one of the Tx, Rx, and LB power consumption control signals to be discussed; and each switch controls a common power supply bus connection for two or more circuit components of RF section 11 which are to have their power supply controlled on a time slot basis. Since the switches and their respective controlled supply teases are thus part of the schematic representation of the RF section 11, they are not individually further discussed or referenced.

Resuming consideration of FIG. 2, circuit components illustrated here and elsewhere bear the same reference characters in all figures. Those components will be mentioned to define the level of resolution of the power consumption control tessellation, but their interactions will not be significantly described since they are well known in the art, and those interactions per se comprise no part of the present invention. The DIF section 36 output digital IF signal is applied via FDAC 21 and the circuit 27 to a first IF segment of the transmit portion 12. In that segment the signal flows through a loopback switch 125, a low pass filter 87, and a fixed attenuator 89 to a first mixer 88 for up conversion to the second intermediate frequency level. At that level, signals flow in a second IF segment through an amplifier 90, a bandpass filter 91 for selecting the upper sideband, and a fixed attenuator 92 to a second mixer 96 which up converts the frequency of the signals to the appropriate radio frequency. Radio frequency signals in an RF segment of the transmit portion flow through an amplifier 97, a programmable attenuator 93 controlled by a DSP-writeable ASIC register via connections 94 which are part of the circuit 31 in FIG. 1A, an amplifier 99, a bandpass filter 98, an amplifier 100, and a power amplifier 101, to the duplexer 18.

Received, radio frequency signals from the duplexer 18 flow in receive portion 13 in an RF segment including a low noise amplifier 103, a bandpass filter 106, another low noise amplifier 107, and a second bandpass filter 108. A first down converting mixer 109 reduces the signal frequency to an IF frequency and couples it to an IF segment including a loopback switch 110 for selecting either the output from mixer 109 or a loopback signal on circuit 124 from switch 125, an amplifier 112, a bandpass crystal filter 113 for passing either of the signals selected by switch 110, and an automatic gain control amplifier 116. A second down converting mixer 117 reduces the IF signal to a baseband frequency and couples it through a pair of tandem amplifiers 118 and 119, a low pass filter 120, and circuit 28 to the ADC 22 in FIG. 1A.

The circuit 124 is connected between terminals on the loopback switches 110 and 125 to provide a selectable loopback path which is employed for coupling the transmit IF signal back to the receive IF section. That loopback path allows a program to self-calibrate the AGC with a VAGC signal to amplifier 116 when the subscriber unit is starting up operation. Loopback is used mainly to adjust (i.e., train) equalization filters implemented in DSP 19 software, by inserting known IF modulation patterns to minimize intersymbol interference caused primarily by nonlinearities in the crystal filter 113 which must pass both the transmit first IF and the receive IF.

Timing and control logic 16 in FIG. 2 includes an oscillator 121 which produces, illustratively, a 43.52 megahertz output frequency signal. That output is coupled through an output circuit 123 (not shown in FIG. 1A) to the control logic circuits 32 in DDF ASIC 20 in FIG. 1A from which timing and synchronization control is developed. Output of oscillator 121 is also applied through a divide-by-two frequency divider 122 and a bandpass filter 126 as a local oscillator frequency to the first mixer 88 in the transmit portion 12. Oscillator 121 output is further applied to the second down converting mixer 117 by way of a frequency divider 128 (divide by four), and an amplifier 130.

Yet another output of oscillator 121 is applied by way of a divide-by-two circuit 127 and a divide-by-four circuit 134 as a reference frequency source for a phase locked loop (PLL) circuit 131. Slashed-lead connections shown on dividers 127, 134 and other dividers in FIG. 2 indicate that the division ratios are advantageously set by appropriately connecting jumpers on external pin connections to such dividers.

PLL 131 operates as a frequency multiplier for receiving a relatively low frequency signal (illustratively about 5 MHz) and generating a higher frequency signal (illustratively about 371 MHz) that is used both as a local oscillator signal in the transmit radio frequency level mixer 96 and as a reference frequency source for a receive PLL 146 which generates a local oscillator signal for the receive radio frequency level mixer 109. In the circuit 131, the signal from divider 134 is applied to a divide-by-8 circuit 132, a phase comparator (PC) circuit 133, a loop filter (LF) 136, and a voltage-controlled oscillator (VCO) 137 to the common connection of a directional coupler 138. Output of the VCO 137 is also fed back through a divide-by-2 circuit 139 and a divide-by-273 circuit 142 to a second input on the PC circuit 133. PLL 131 and PLL 146 also provide a LOCK LOSS status indicator on a circuit 140 (not shown in FIG. 1A) to the DDF ASIC 20. Directional coupler 138 connects the output of PLL 131 to an amplifier 141, the output of which is connected through a fixed attenuator 144 to the local oscillator input of second mixer 96 in the transmit section 12. The PLL 131 output is also applied through directional coupler 138 to a receive portion mixer 143 where it is mixed with the output of a VCO 145 of the PLL 146. Output of mixer 143 is connected in PLL 146 to a phase comparator 147 which also receives a reference frequency signal from SDAC 45 (FIG. 1A) by way of a low pass filter 148 and a divide-by-two circuit 149. The PC 147 output is coupled through a loop filter 135 to the VCO 145. Output of that VCO is further coupled via an amplifier 150 to the local oscillator input of the first down converting mixer 109.

Figure 4:
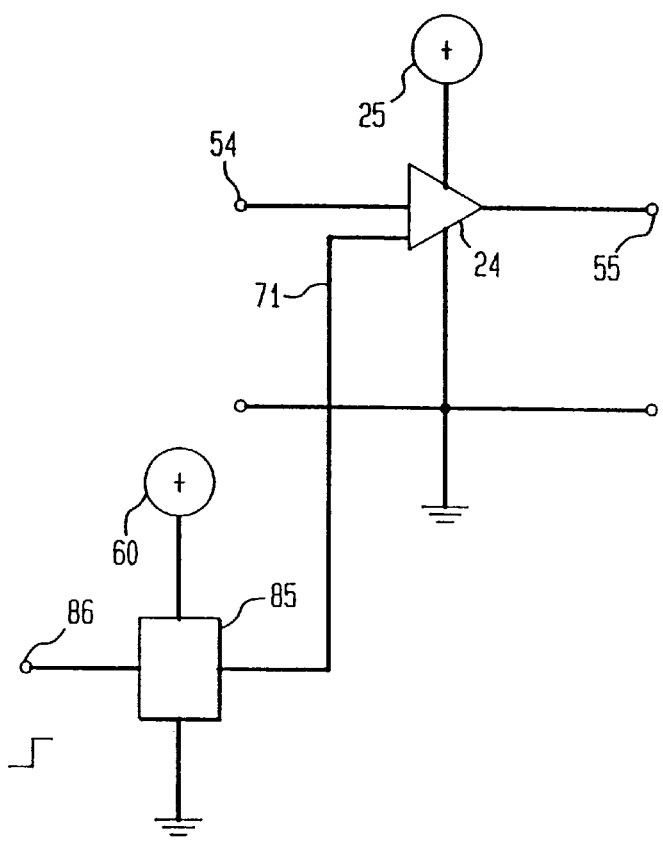
FIG. 4 is a schematic diagram of a bias current; powering down, control circuit embodiment.

Also included in the RF section is a power interface circuit 151 which shifts the levels of the four signals ot circuit 31 from CMOS levels (about 5 volts) to RF power control levels to produce the actual signals that power up or down the circuit components of RF section 11. Circuit 151 is well known primarily combinatorial logic and level shifting circuitry which receives the circuit 31 signals Tx, Rx, PA ENABLE, and LOOP BACK. Circuit 151 produces three power consumption control signals transmit Tx, receive Rx, and loopback LB which, as mentioned in connection with FIG. 3, control operation of circuit components to be powered up and down. A fourth power consumption control signal, PAEN, also is produced by circuit 151. The PAEN signal controls operation of the power amplifier 101 which also is powered up and down; but a bias current control technique, to be described in connection with FIG. 4, is advantageously employed in that case. Time slots when those four signals, and other power consumption control actions, are On or Off will be explained subsequently in connection with Tables 1 and 2 below and FIGS. 5 and 6. Those four signals are, as illustrated, applied to correspondingly designated power consumption control connections by leads which are not shown. Thus, the Tx signal is applied to control power consumption of transmit portion amplifiers 90, 97, 99, 100, and 141. The PAEN signal is applied to control power consumption of the power amplifier 101 and advantageously goes high after the Tx signal goes high and goes low before the Tx signal goes low to avoid the possibility of transmitting spurious frequencies while the transmit portion mixer outputs are becoming stable. The Rx signal is applied to control power consumption of the receive portion mixer 117 and amplifiers 103, 107, 112, 116, 130, and 150. Finally, the LB signal is applied to the loopback switches 110 and 125 and to control power consumption of the receive portion mixer 117 and amplifiers 112, 116, and 130.

Some circuit components in RF section 11 are powered up at all times; and, of course, passive circuit components lack power supply connections. Transmit portion mixers 88 and 96, and receive portion mixers 109 and 143 are passive. PLLs 131 and 146 are always powered up because they have relatively long time constants of operation compared to a TDMA time slot duration. Once powered down, the PLLs require nearly a full time slot to restore full, powered up, stable operation. Receive portion amplifiers 118 and 119, and dividers 122, 127, 128, and 134 are always powered up in the RF section 11 because each consumes such a small amount of power that to control their power consumption would require adding extra components with little return in economic value based on power conservation. Also, some of their outputs are necessary for proper operation of PLLs 131 and 146. Since PLLs 131 and 146 are kept powered up, their input signal generating circuit components, i.e., dividers 127 and 134, also are kept powered up.

FIG. 4 depicts a simplified schematic diagram illustrating one way to control power consumption of an amplifier by turning on and off its bias current. Such bias current control is advantageous for, e.g., power amplifiers because their relatively high operating power supply current may involve use of a relatively costly, heat-sinked, power transistor to switch such current. In the diagram, an amplifier 24 to be controlled has the usual power supply connections represented by a grounded voltage source 25. Input signals to be amplified are applied at terminal 54. Amplified signals are presented at output terminal 55. A switchable constant-current supply 85, supplied from a further voltage source 60, is employed as a bias current generator. Such switchable constant-current supplies are well known in the art. Supply 85 is connected to a bias current input 71 of amplifier 24 to establish a bias current which is sufficient to assure amplification of the largest signal level anticipated at the input terminal 54. An input connection 86 of supply 85 is maintained at a positive voltage, advantageously eight volts in one application, to cause supply 85 to supply the aforementioned sufficient bias current to amplifier 24 to cause it to consume power at a first, or normal, power consumption level. When input connection 86 of supply 85 is maintained at zero volts, the bias current output of supply 85 is reduced to essentially zero current, which causes amplifier 24 to consume substantially less power than it does at its normal power consumption level. Supply 85 also consumes less power in its zero-input, zero-output state. A power enable control signal is applied to the input connection of supply 85 to actuate it for changing the bias current applied to amplifier 24. This bias current type of power consumption control technique is schematically represented in, e.g., FIG. 2 by a switched-lead bias input connection such as that designated PAEN for power amplifier 101.

Figure 5:
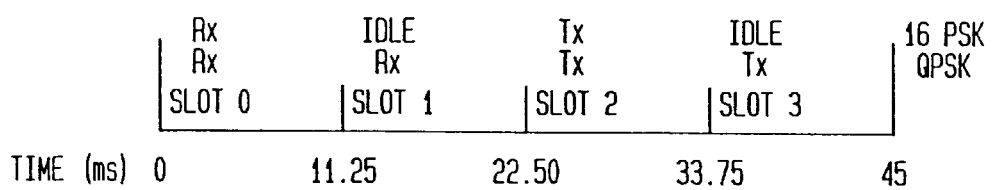
FIG. 5 is a diagram of the prior art time slot structure utilized in an illustrative embodiment of the subscriber unit of FIG. 1.

FIG. 5 is a known time slot structure diagram for a TDMA system in which each TDMA recurring time frame is illustratively 45 milliseconds (ms) in duration. That frame is the basic unit of time during which the system program running in the DSP 19 cycles through the elemental operations for a given state of subscriber unit operation, as will be described further in connection with FIG. 6. In a typical TDMA system that basic time frame recurs at a rate which is less than the Nyquist frequency for a typical voice signal being processed, and it is greater than the average frequency of changes among subscriber unit functions such as on-hook, off-hook, and ringing. Each frame is divided into four time slots designated as slots 0, 1, 2, and 3; and each time slot is illustratively 11.25 ms in duration. Power consumption savings are realized during time slots in which a subscriber unit is idling with all power-consumption-controllable circuit components powered down or during time slots in which it is operating with only a portion of its power-consumption-controllable circuit components powered up and the remainder powered down.

The manner in which the subscriber unit 20 moves among its various states of operation in relation to the time slot structure will be discussed in connection with FIG. 6 and then those state operations will be considered in terms of power consumption control in relation to Tables 1 and 2 below. First, however, there are two types of subscriber unit operation that are considered. A first type is quadrature phase shift keyed (QPSK) and a second type is 16PSK. In QPSK operation, a subscriber unit, operating in a half-duplex mode on a duplex frequency channel, serves one subscriber line. As indicated in FIG. 5, the subscriber unit receives in time slots 0 and 1 as one QPSK time slot and transmits in time slots 2 and 3, respectively, as one QPSK time slot. This double time slot operation is useful for subscriber units in locations of weak reception because it yields higher signal-to-noise ratio operation than does 16PSK single time slot operation.

Another subscriber unit could use the same channel for one line, also in QPSK half-duplex mode, by receiving in time slots 2 and 3 and transmitting in time slots 0 and 1.

Alternatively, a single subscriber unit could serve two lines by operating in a QPSK full-duplex mode, when both lines are engaged in calls at the same time, in which the double time slot 0 and 1 would be used at the same time to transmit for the first line and receive for the second line. Conversely, double time slot 2 and 3 would be used at the same time to receive for the first line and transmit for the second line. Time-slot based powering down benefits are not available when a subscriber unit operates in the dual-line, full-duplex mode.

In 16PSK half-duplex operation, there are more opportunities for flexibility of operation and for power consumption saving than in QPSK operation. Some examples of possible configurations are outlined, assuming a dual-frequency channel. As indicated in FIG. 5, a subscriber unit, in single-line service, receives in time slot 0, transmits in time slot 2, and is idle in time slots 1 and 3. A second subscriber unit could use the same channel to receive in time slot 1, send in time slot 3, and idle in time slots 0 and 2.

One subscriber unit is able to serve two lines by having one subscriber line receive in time slot 0 and transmit in time slot 2 and the other subscriber line receive in time slot 1 and transmit in time slot 3. Concurrently, another subscriber unit can use the same duplex frequency channel in the half-duplex mode for two 16PSK calls by receiving in time slots 2 and 3, respectively, and transmitting in time slots 0 and 1, respectively. Alternatively, in 16PSK, full-duplex, dual-line operation, a first line could transmit voice in slot 0 and receive in slot 2, while a second line transmits voice in slot 2 and receives in slot 0.

There is also a third type of operation when the subscriber unit is in standby mode awaiting possible initiation of a call and is tuned to the frequency of a duplex radio control channel (RCC) of the TDMA system. The RCC is normally modulated in the binary phase shift keyed (BPSK) mode, and a subscriber unit also operates BPSK when it is monitoring the RCC. BPSK modulation is more robust than the QPSK, double time slot, modulation; so it reliably reaches even the remote regions which provide subscriber call service with QPSK modulation. When a QPSK subscriber unit is tuned to the RCC, and is situated to serve a single line, it receives the RCC in time slot 0 and is idle in the other three time slots; though if the unit is contacted by its base station (not shown), or if a served subscriber takes the telephone set off-hook, it transmits its necessary handshake messages in time slot 2 to get a communication channel assignment. When a subscriber is engaged in a call and the remote party goes on-hook, the subscriber unit is still tuned to the voice channel; so it is usually commanded to go on-hook by the base station appropriately setting one of several overhead bits in the digital signal on the voice channel.

When a subscriber unit, operating either QPSK or 16PSK, serves a single line, it is able to realize the greatest time-slot-based power consumption saving. As additional lines are added to a subscriber unit operating in 16PSK or in QPSK, the time-slot-based power consumption falls off because there are fewer time slot opportunities for the subscriber unit to be in an idle, or in a partially powered down, state. Also, when additional lines are added to a subscriber unit, or additional subscriber units are added to a channel, it may become advantageous to change the mode of operation of the RCC in order to assure that whenever a subscriber line engaged in a call goes on-hook there will be a time slot available in which the serving subscriber unit will be able to monitor the RCC. To that end, the RCC can be organized to repeat the broadcast of all control messages for subscriber units in every TDMA time slot of its duplex frequency channel. Then any subscriber unit that is operating in the dual-line, full-duplex mode can, when one line goes on-hook, utilize the vacated receiving time slot to listen on the RCC and utilize the corresponding transmitting time slot to send any appropriate response. As another alternative, in-band ("blank and burst") signaling could be used by substituting RCC control information for one active voice time slot in a TDMA frame, momentarily interrupting the voice conversation.

Figure 6:
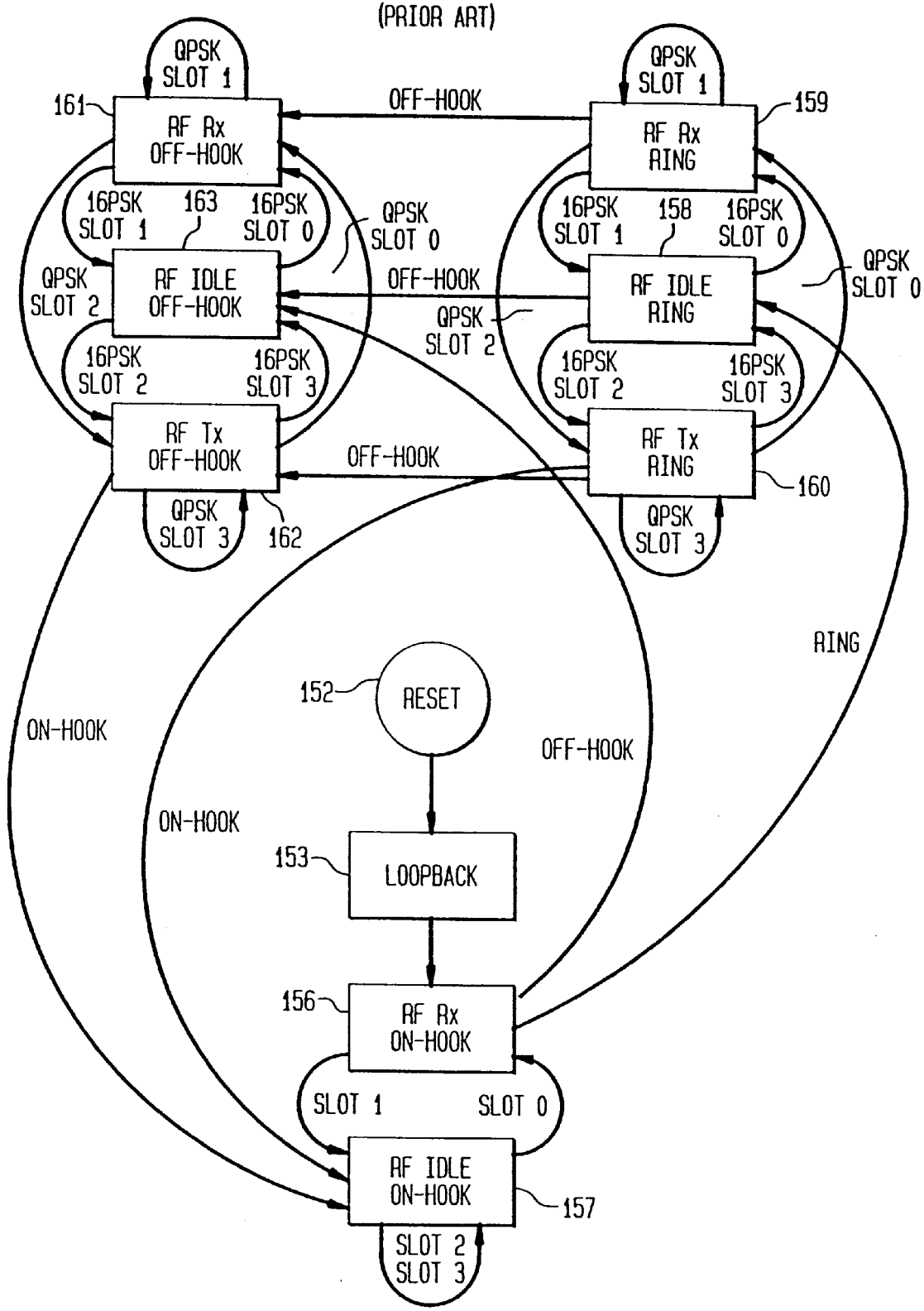
FIG. 6 is a state diagram illustrating prior art aspects of the TDMA operation of the subscriber unit of FIG. 1 and utilizing the time slot structure of FIG. 5 for both quadrature phase shift keyed (QPSK) operation and 16-phase phase shift keyed (16PSK) operation.

FIG. 6 is a known state diagram depicting subscriber unit transitions among its various states, and within states, in relation to the time slot structure of FIG. 5. FIG. 6 contains three major loops: on-hook function (states 153, 156 and 157); ringing function (states 160, 158, and 159); and off-hook function (states 161, 163, and 162). When the subscriber unit 10 goes into service, operating power is turned on and the unit initializes itself in a reset function 152. Upon completion of that reset function, the unit moves into a loopback state 153 in which the LB signal in FIG. 2 actuates the switches 110 and 125 and powers up amplifiers 112, 116, and 130 to activate the loopback circuit connection 124 as noted in connection with FIG. 2. During reset and loopback functions, time slots are not a concern because there is no utilization of the radio link. Upon completion of the loopback training function, the unit changes to the receiving, on-hook state 156 (RF Rx On-hook) where it operates in the receiving mode during time slot 0 to await initiation of either a page message from a base station, e.g., a call to the served subscriber, or a subscriber telephone set off-hook condition detected in SLIC 56 in FIG. 1B, e.g., a call from the served subscriber. In time slot 1 the unit 10 changes to an RF Idle On-hook state 157, where it operates in a low power consumption condition, sometimes called "sleep," during time slots 1, 2, and 3. At the end of time slot 3, the unit returns to state 156 to receive any page messages or off-hook states that may be detected, and it continues to cycle through states 156 and 157 until such an event occurs. Additional power savings can be realized by keeping the subscriber unit in the idle, or sleep, mode for seven out of the eight time slots of two successive frames instead of just three out of four time slots of each frame in this on-hook loop.

Upon receipt of a page message or detection of an off-hook condition, the unit 10 executes any necessary handshake transmissions to the base station during time slot 2 (not shown in FIG. 6 or the Tables); and, assuming a page message incoming, it then shifts to an RF Idle Ring state 158 and begins ringing the served subscriber telephone instrument. For the present, QPSK operation will be assumed; so in time slot 0 the state shifts to an RF receive ringing (RF Rx Ring) state 159 where operation remains until the end of time slot 1 to keep the subscriber unit informed that the calling party is still waiting. In time slot 2, operation shifts to an RF transmit ring (RF Tx Ring) state 160 where it remains until the end of time slot 3 so that occurrence of an off-hook condition at the subscriber telephone set can be transmitted back to the base station. At that time operation changes back to the RF Rx Ring state 159 for time slots 0 and 1 of the next frame. Operation continues to cycle in this manner until an off-hook condition is detected, and then from either of states 160 or 159 operation shifts to a corresponding one of the Off-hook states RF transmit Off-hook (RF Tx Off-hook) 162 or RF Receive Off-hook (RF Rx Off-hook) 161, respectively. If the served subscriber telephone set should never go off-hook in response to the ringing, the operation ultimately times out and drops back to the RF Idle On-hook state 157 from the RF Tx Ring state 160.

Assuming that the served subscriber telephone instrument does go off-hook, then, in a similar manner to QPSK ringing (states 160 and 159), operation cycles between states 162 in time slots 2 and 3 (subscriber unit transmitting) and 161 in time slots 0 and 1 (subscriber unit receiving) during the continuance of the call connection. When the served subscriber telephone set goes on-hook at the end of the communication for which the call connection was established, operation again drops back to the RF Idle On-hook state 157 to await initiation of another call.

Operation in the 16PSK mode is different from that in the QPSK mode in that there are RF Idle states 158 and 163 in the respective Ring and Off-hook function loops. The On-hook function of the state diagram is unchanged. In 16PSK operation of the Ring function loop, operation begins at the RF Idle Ring state 158. The illustrated operation applies to a subscriber unit that has been assigned to use time slot 0 to receive and time slot 2 to transmit. If the loop is entered at state 158 at the end of time slot 3, it then shifts to state 159 for time slot 0 and back to state 158 for time slot 1. Then it shifts to state 160 for time slot 2 and back to state 158 for time slot 3. Operation continues in those two sequential Ring function loops either until the ringing operation times out, and there is a shift from state 160 back to state 157, or until an off-hook condition is detected, and there is a shift from any of the states 158, 160, or 159 to a corresponding one of the off-hook function states 163, 162, or 161, respectively. Operation continues in the two sequential off-hook function loops in a manner similar to that outlined for the Ring function loops for the duration of the call connection. When the served subscriber telephone set goes on-hook, operation drops back to the RF Idle On-hook state 157 to await another call.

The foregoing description of FIG. 6 assumed that the initiated call, after the subscriber unit 10 had come into service and was idling in the On-hook function loop, was a received-page message. If the call had been initiated by the subscriber telephone set being served having been taken off-hook, operation would have shifted from the RF Rx On-hook state 156 to the RF Idle Off-hook state 163 and proceeded from there in a manner similar to that already described.

In one subscriber unit 10 embodiment operating with time-slot based power consumption control, i.e., limiting power consumption of the subscriber unit 10 as described above, the DC/DC converters 9 of FIG. 1A were supplied from a single 12-volt, 15-ampere-hour backup battery kept charged by an AC to DC power supply. Alternatively, converters 9 were supplied by a backup battery kept charged by up to two nominal 12-volt, 48 watt peak, solar panels.

Operation of a subscriber unit 10 in the half-duplex 16PSK mode is preferred for power conservation because of the power savings realized with the use of the RF Idle Off-hook state 163 during two time slots of every off-hook function frame, as well as the savings realized by the changing powering down tessellations for the transmit and receive time slots. The power savings are not as great in the half-duplex QPSK mode of operation because there is less idle time; but this mode is more robust in a signal to noise ratio sense; so it is useful for subscriber units that may be located where reception is relatively weak compared to locations where 16PSK operation is employed. Full-duplex operation is possible for either QPSK or 16PSK operation and for either data or voice communication. DSP 19 has ample processing capability to handle dual-line operation because, e.g., the previously mentioned DSP chip has the ability to operate at about twenty million instructions per second (MIPS), which is about thirty percent faster than is required for dual-line operation with respect to voice communication. Full-duplex operation offers the least energy savings on a per-subscriber-unit basis because the Tx and Rx signals must be high, and other corresponding parts of the subscriber unit 8 must be powered up, at all times during a call connection, i.e., during the off-hook and ringing function loops of the state diagram of FIG. 6. However, there are still significant power savings on a per-line basis. For example, a dual-line subscriber unit will realize power savings at any time when either of its served lines is not actively engaged in call traffic. Also, each dual-line subscriber unit can serve twice the number of lines that it could have served as a single-line subscriber unit; and there is also a hardware saving in that fewer subscriber units are required for a given number of lines.

In dual-line service operation, the off-hook loop of FIG. 6 would be essentially duplicated for a second line served by the subscriber unit 10. The difference would be that the time slot positions of the RF Tx Off-hook state 162 and the RF Rx Off-hook state 161 in the loop would be interchanged. Similarly, if both lines were receiving ringing from their respective ring circuits 58 at the same time, their corresponding ringing loops (reflecting operation of the remainder of the subscriber unit at that time) would, for one line, be as shown in FIG. 6 and, for the other line, be similar except that the time slot positions in the loop of the RF Tx Ring state 160 and the RF Rx Ring state 159 would be interchanged.

Table 1—Initiate/Ring Circuit State Table and Table 2—On-hook/off-hook Circuit State Table shown below illustrate more specifically in relation to the state diagram of FIG. 6 how the power consumption control tessellation of the subscriber unit 10 changes in accordance with the invention along with changes in the state of operation of the unit in single-line service. The first column on the left in the tables lists the subscriber unit circuit components which are subjected to power consumption, time-slot-based control. The RF Section and the Power amplifier, which is part of the RF section, are separately shown. The remaining ten columns in the two tables together correspond to the ten subscriber unit states of FIG. 6, and listed in those ten columns are the power consumption levels of the circuit components in the first column. Hence the configuration of the power control tessellation for any of the subscriber unit states in FIG. 6 is represented in the power consumption level indicators in the column of the same name and state number in one of the Tables 1 or 2. A circuit component is powered up (On) in time slots when it is needed for call or control signal processing, and it is powered down (Off) in other time slots. Although some circuit components stay powered up at all times during in-service operation of the subscriber unit, the result of powering up or down the other components on a TDMA time slot basis is substantially lower power consumption than has been experienced in subscriber units in which the entire unit is powered up or down on a call basis, or on a call state basis, or even when transmit and receive parts of a subscriber unit modem are powered up at different times.

Consider first Table 1. The RF Section experiences four different power control levels. It is to be recalled from FIG. 2 that the power amplifier 101 is powered up at approximately the same times (with a small fraction of a time slot later power up and a small fraction of a time slot earlier power down) that the Tx signal experiences a level to power up circuit components. The RF section is idle (Off) during Reset when none of the signals LB, Tx, and Rx is active to power components up. That same idle powering prevails during the RF Idle Ring state 158. During the Loopback state 153, the power-controlled circuit components of the RF section 11 in only the loopback path from switch 110 through the amplifier 119 are powered. In the RF-Rx Ring state 159 only the Rx control signal is present; so the power-controlled circuit components of the RF section in only the receiving portion 13 are powered up. Similarly, during the RF-Tx Ring state 160, only the Tx control signal is present; so the power-controlled circuit components of the RF section 11 in only the transmitting portion 12 are powered up. Likewise in Table 2, no power controlled circuit components of the RF section 11 are powered up when the subscriber unit is idling in the RF-Idle On-hook and Off-hook states 157 and 163, respectively. Power-controlled circuit components of RF section 11 in only the receive portion 13 are powered up during the RF-Rx On-hook and Off-hook states 156 and 161, and only those in the transmit portion 12 are powered up during the RF-Tx Off-hook state 162.

Note in the Tables 1 and 2 the correlation between the Table terminology and the operating power consumption level of the listed circuit components of the subscriber unit. For the RF section 11, the state control signals Rx, Tx, and Loopback provided by the power interface circuit 151 are utilized to indicate relative power consumption levels in each subscriber unit operating state, except for the states 152, 158, and 163 where "Idle" indicates that all power-controlled circuit components are powered down. For other circuit components of the subscriber unit, "On" indicates that the circuit component is in its power consumption level for its primary signal processing function; and "Off" indicates that the circuit is in a lower power consumption level for other indicated subscriber unit

TABLE 1

INITIATE/RING CIRCUIT STATE TABLE

| STATE OF SU CIRCUIT | RESET (152) | LOOPBACK (153) | RF-Rx RING (159) | RF-Tx RING (160) | RF-Idle RING (158) |
|---|---|---|---|---|---|
| RF Sec'n | Idle | Loopback | Rx | Tx | Idle |
| PA | Off | Off | Off | On | Off |
| ADC | Off | On | On | Off | Off |
| DSP | On | On | On | On | On |
| SLIC | Off | Off | On | On | Off |
| CODEC | Off | Off | Off | Off | Off |
| Ringer | Off | Off | On | On | On |
| DIF | Off | On | Off | On | Off |
| FDAC | Off | On | Off | On | Off |
| INT | Off | On | Off | On | Off |
| FIR | Off | On | Off | On | Off |
| RAM | On | On | On | On | On |
| FLASH | On | On | On | On | Off |
| DDS | Off | Off | On | On | On |
| SDAC | Off | Off | On | On | On |

TABLE 2

ON-HOOK/OFF-HOOK CIRCUIT STATE TABLE

| STATE OF SU CIRCUIT | RF-Rx ON-HOOK (156) | RF-Idle ON-HOOK (157) | RF-Rx OFF-HOOK (161) | RF-Tx OFF-HOOK (162) | RF-Idle OFF-HOOK (163) |
|---|---|---|---|---|---|
| RF Sec'n | Rx | Idle | Rx | Tx | Idle |
| PA | Off | Off | Off | On | Off |
| ADC | On | Off | On | Off | Off |
| DSP | On | Off | On | On | On |
| SLIC | Off | Off | On | On | On |
| CODEC | Off | Off | On | On | On |
| Ringer | Off | Off | Off | Off | Off |
| DIF | Off | Off | Off | On | Off |
| FDAC | Off | Off | Off | On | Off |
| INT | Off | Off | Off | On | Off |
| FIR | Off | Off | Off | On | Off |
| RAM | On | Off | On | On | On |
| FLASH | On | Off | On | On | On |
| DDS | On | On | On | On | On |
| SDAC | On | On | On | On | On | functions, this even though the circuit actually may be consuming some supply power. Although the ringer is indicated as being On (i.e., Ring) in all three states of the ringing function loop of FIG. 6, it is to be understood that superimposed on the ringer operation are the base station commands which establish a certain ringing cadence, such as two seconds On and 4 seconds Off, for alerting a subscriber. Consequently, during the On-portion of the cadence the ringer is on during all time slots of every TDMA frame of the ringing function loop; and during the Off-portion of the cadence the ringer is off (lower power consumption level) during all time slots of every TDMA frame of the ringing function loop.

The FIR section 33, INT section 34, DIF section 36, and FDAC 21 go on and off together. The DDS 44 and SDAC 45 also go on and off together, and they are on during all operating times and off during the initializing RESET state 152 and LOOPBACK state 153.

DSP 19 is on, i.e., fully powered, in all states except the RF-Idle On-hook state 157 when it has put itself to sleep. In that sleeping state it consumes enough power to retain operating state information so it can resume processing when a wake-up interrupt is received, and that is the least power short of being turned off completely.

DSP 19 could also sleep for shorter periods of time than shown in the tables above. For example, during a 16PSK call, in which a subscriber unit transmits voice to the base station during time slot 2 and receives voice from a base station in time slot 0, DSP 19 synthesizes (sometimes called RELP decoding) received voice during slot 0 and part of slot 1. After voice synthesis is finished, DSP 19 could go to sleep until the end of slot 1, waking up only to transfer PCM samples to CODEC 57 every 125 microseconds, using an interrupt (not shown). Similarly, DSP 19 could sleep for some fraction of time slot 3, after voice analysis is finished (sometimes called RELP encoding) is finished. This power-saving technique could be used in states 158 and 163 of FIG. 6.

CODEC 57 is in a low power condition (i.e., disabled or "Off") during all states except those in the Off-hook function loops of FIG. 6. SLIC 56 is in a low power condition (i.e., disabled or "off") during all states except those in the off-hook function loops, and the transmit and receive times of the ring loop. However, even during its disabled state in the on-hook loop, SLIC 56 still monitors on/off hook status. The SLIC and CODEC are powered down by respective power down commands.

The Ringer, i.e., ring circuit 58, is off at all times except during the on-times of its ringing cadence in the ringing function loops of FIG. 6; and when off it is fully powered down.

Among the memory circuit components, RAM 39 is powered on and off at the same times as is the DSP; but it consumes most power while actually being accessed. The FLASH memory 40 is powered on and off at the same times as RAM 39 except in the RF-Idle Ring state when the FLASH memory is off, and except during times (not indicated in the Tables) when it performs ROM-type functions. FLASH memory 40 is on for use during the Reset state since it is the repository for data needed to initiate subscriber unit operation when it is coming into service or in the event that some fault makes it necessary to restart the unit from known parameters. The FLASH memory 40 is about four times as large as the RAM 39; and it is about one third as fast as, and consumes somewhat less power than, the RAM 39. The FLASH memory is advantageously used by the DSP 19 as RAM to execute segments of program for most non-time-critical control tasks in a manner known in the art. One example is the subscriber control loop which uses FLASH RAM to execute a state control routine to synchronize task processing, thereby enabling the subscriber unit to move from state to state as shown in FIG. 6. During this execution (not shown in the Tables), the fast RAM 39 memory is effectively powered-down, since it is rarely accessed to write data; while the slower and less-power-consuming FLASH RAM is used in its place. The particular DSP circuit previously identified for use as DSP 19 has a programmable wait-state generator which allows the use of slower or faster program memory at different memory locations, as described in the Critchlow patent.

Figure 7:
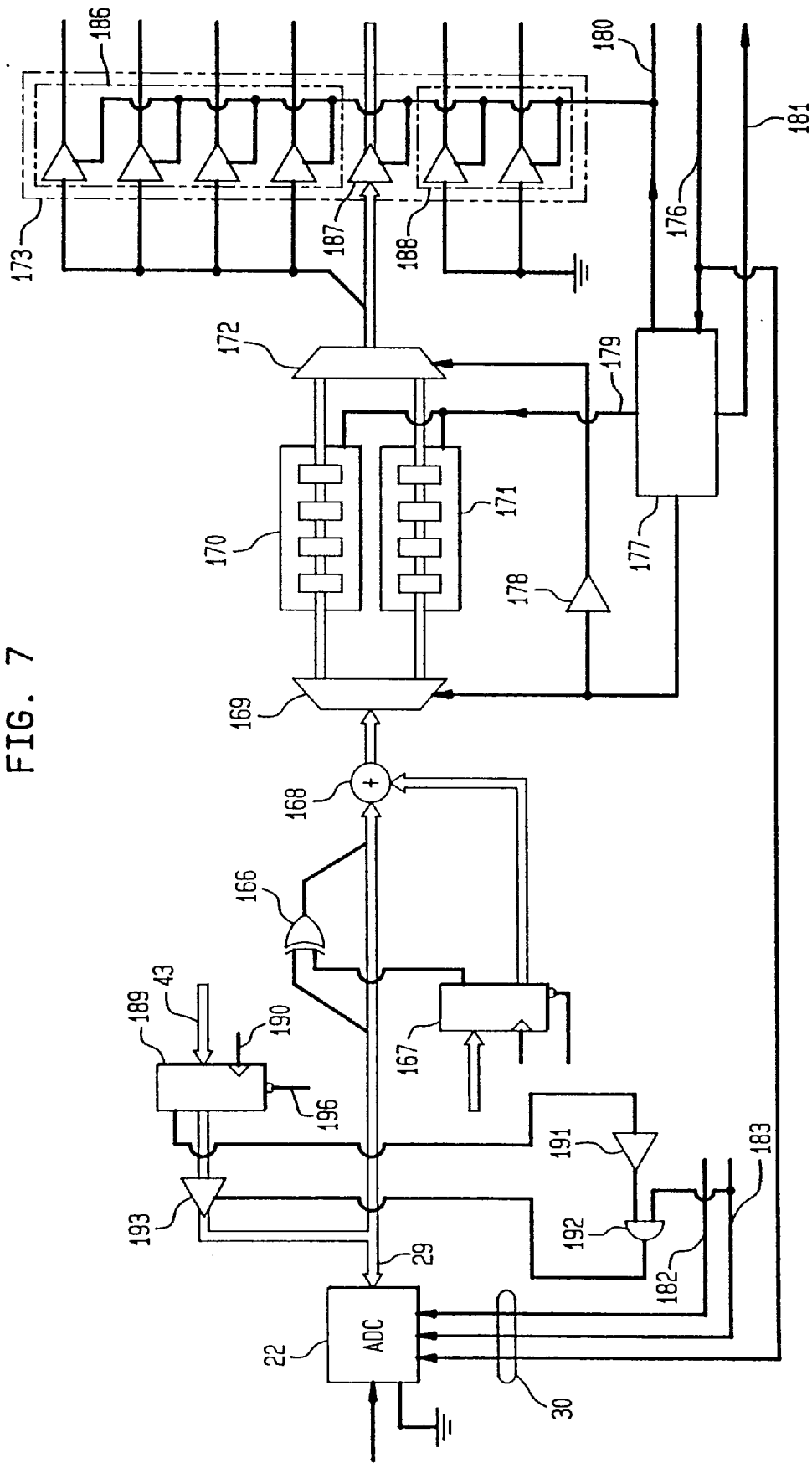
FIG. 7 is a block and line diagram of an analog to digital interface circuit on a DDF ASIC of the subscriber unit in FIG. 1.

FIG. 7 shows FIFO logic circuit 37 of FIG. 1A in somewhat greater detail to illustrate the injection of a power consumption command in the reverse direction on bi-directional circuit 29 to the ADC 22. As noted earlier, that ADC is advantageously a commercially available circuit chip which includes a controllable internal powering down function and is adapted to receive certain of its control commands by way of its digital output port. In addition, the circuits of FIG. 7 perform certain other functions to lighten the processing burdens on DSP 19 and thereby reduce its processing time so it can sooner power itself down in idle time slots to save power.

ADC 22 produces an m-bit, offset binary output; but the DSP 19 requires an n-bit, 2's complement word format for processing. In FIG. 7 the transition between the two word formats is accomplished, m being illustratively ten and n being illustratively sixteen. The 10-bit offset binary output from ADC 22 on circuit 29 has its sign bit inverted or not in an exclusive-or (EX OR) gate 166 in response to the binary state of the most significant bit (MSB) from a DC offset register 167 which holds an 11-bit offset correction value loaded under program control from the DSP 19. The remaining ten bits from the register 167 are combined additively with the data bits by an adder 168 to form 2's complement words. Four-word groups of sum words, i.e., offset-corrected, 2's complement data, from adder 168 are steered through a demultiplexing switch 169 to one or the other of two multiword shift registers 170 and 171 operated as an alternating buffer for data flow to the DSP 19, loading register 170 while emptying register 171, and vice-versa. A multiplexing switch 172 selects a registered group of words for application to a shifting and sign extension gate network 173. A read strobe signal on a lead 176 initiates read out of a new ADC sample to be processed by DSP 19, and that signal is coupled through a steering control circuit 177 to control switch 169 and, through an inverter 178, switch 172.

Circuit 177 also provides an output on a circuit 179 to the FIFO registers for enabling word readout from one of registers 170 or 171 and stepping remaining words in that one register through that one accordingly. Output from the FIFO buffer is shifted and sign extended in the gate network 173 to convert the 10-bit data into the 16-bit format used for processing in the DSP 19. The most significant bit of the ten data bits is applied through four gates of a subset 186 of network 173 to be replicated as the four most significant bits of the 16-bit word read by the DSP. All ten bits of the ADC sample are also coupled through respective ones of separate gates, schematically represented as but one gate 187, to become the next less significant ten bits of the 16-bit word as read by the DSP. The two least significant bits of the 16-bit DSP word are forced to zero by grounded inputs on the two gates of a gate subset 188. A DSP read strobe signal on circuit 180 from control circuit 177 also enables gates 186–188 to couple data onto the DSP bus 42 in FIG. 1. A ready output signal is coupled on a lead 181 from circuit 177 to signal DSP 19 when there is a new group of data words in place to be read out. The lead 176 signal is also used, along with signals on leads 182 and 183, via circuit 30 to control operation of ADC 22.

ADC 22 is powered up for loopback operation and during a receive time slot. Thus, it receives a power up command at the end of the reset operation and at the end of the time slot prior to a receive time slot, and it receives a power down command at the end of the loopback operation and at the start of the time slot following a receive time slot. A multibit command word for ADC 22, coupled from the DSP 19 via control logic circuits 32 and connection 43, is loaded into a register 189 in response to a DSP write signal on a separate input lead 190 during an idle time slot operation of the subscriber unit 10. That command word directs several aspects of ADC 22 operation, but the bits that direct power consumption control are of principal interest here. The MSB output from the register is coupled through an inverter 191 to AND gate 192. At the end of an idle time slot preceding a receive time slot, a processor signal on lead 183 activates gate 192; and its output actuates a gate 193 to couple the command word from register 189 onto the bi-directional circuit 29, which is at that time idle. The power control bits in that command cause ADC 22 to power up. A similar operation at the start of an idle time slot following a receive time slot causes ADC 22 to power down. Likewise, similar operations at the start and end of the loopback operation control powering up and down at those times, respectively. A power-on reset signal is applied to a lead 196 to clear register 189 in preparation for normal operation.

Figure 8:
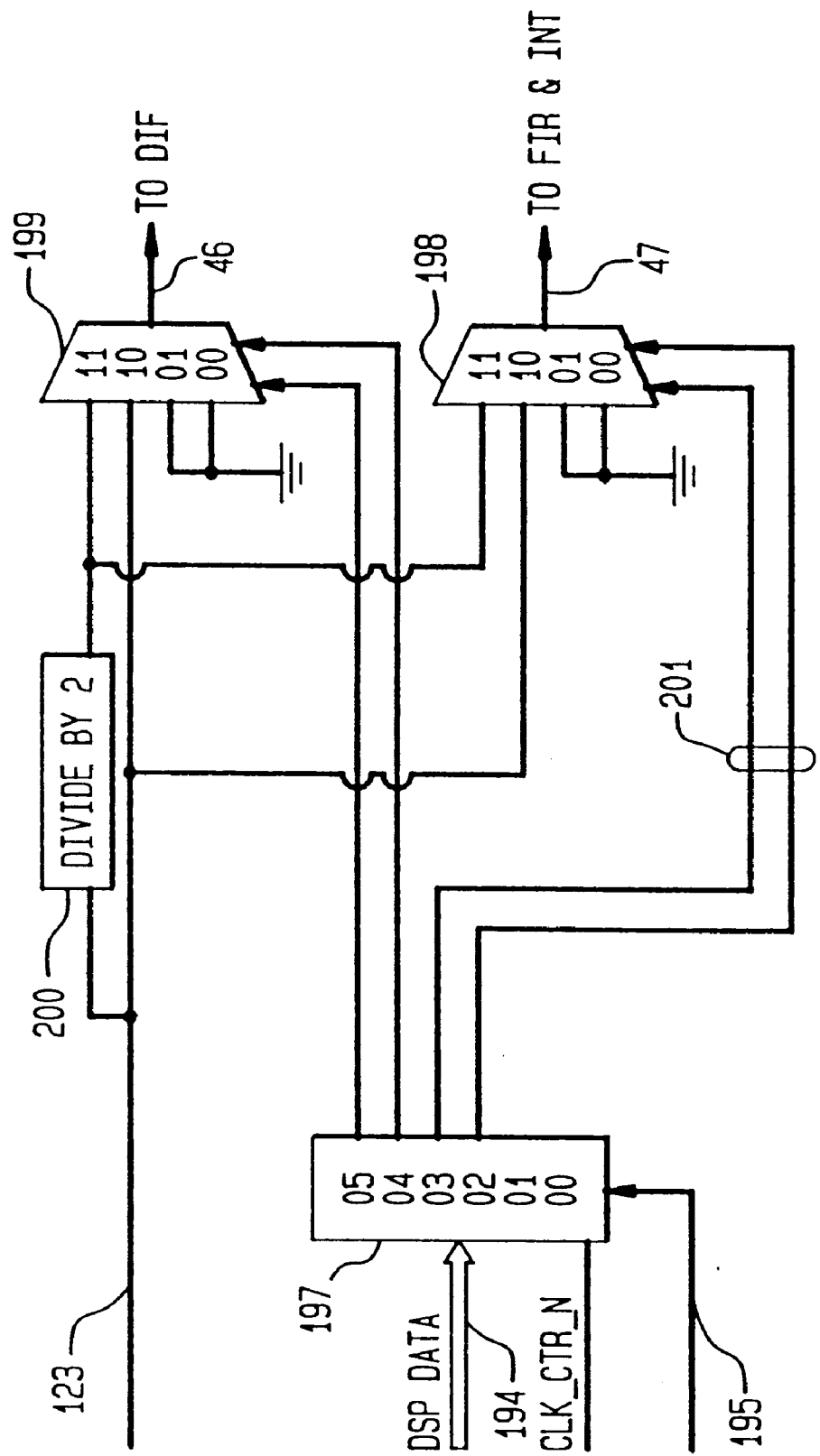
FIG. 8 is a block and line diagram of a command responsive clock selection circuit on the DDF ASIC of the subscriber unit in FIG. 1.

FIG. 8 illustrates clock signal selection logic which is a part of the control logic circuits 32 in FIG. 1A. The clock selection logic is used to turn clock signals on and off for several circuit components of the subscriber unit 10 to control power consumption. During idling, e.g., during the RF-Idle On-hook and Ring states 163 and 158 and the RF-Idle On-hook state 157 in FIG. 6, when many circuit components of subscriber unit 10 are powered down, timing circuits in control logic 32 keep track of frame, slot, and bit timing. Two of those clock signal controls relevant to the present invention are shown in FIG. 8.

A reset signal on a lead 195 resets a register 197 on power-up. A CLK_CTR_N address bit from an address decoder (not shown) in circuits 32 updates register 197 with a data word from a circuit 194 from bus 42. The word controls output clock signal states by controlling use of a frequency divided version of a clock signal received on lead 123 from timing and control logic 16 in FIG. 2. Register 197 illustratively has a 7-bit capacity, bits Q2–Q5 being of interest in the present description.

A clock signal (e.g., 43.52 MHz) is supplied on lead 123 from the timing and control logic 16 in FIG. 2. That lead extends to an input of each of two multiplexers 198 and 199. Each multiplexer is controlled by the binary signal states of signals on a pair of control leads from the output of register 197. Control signal combinations that select each multiplexer input are marked on the multiplexer adjacent to such input. Multiplexers 198 and 199 each also has two further inputs connected to electric circuit ground. Lead 123 is also connected through a divide-by-2 circuit 200 to another input of each of the multiplexers 198 and 199.

A lead pair 201 connects bits Q2 and Q3 of register 197 to multiplexer 198 which supplies clock signals to both the FIR section 33 and the INT section 34 of DDF ASIC 20. If those two bits are either 00 or 01, a ground (no clock) is supplied; and the FIR section 33 and INT section 34 are powered down as previously described. If those two bits are the FIR section clock is supplied at the clock frequency on lead 123 to power up the FIR section 33 and INT section 34, and if the two bits are 11 the FIR clock is supplied at the lower, i.e., divided by two, clock frequency from divider 200. In the latter case the FIR and INT are powered up but at only half the clock frequency so they operate with significantly lower power consumption while operating. The availability of the low rate clock for selection by program is advantageous flexibility since operation in some countries does not require the higher rate of clocking for these circuit components.

Similarly, bits Q4 and Q5 of register 197 are connected to control multiplexer 199 to cause the clock to the DIF section 36 of DDF ASIC 20 to be turned off, or turned on at the full rate, or turned on at the half rate to control the DIF section operation as well as thereby controlling its level of power consumption.

Figure 9:
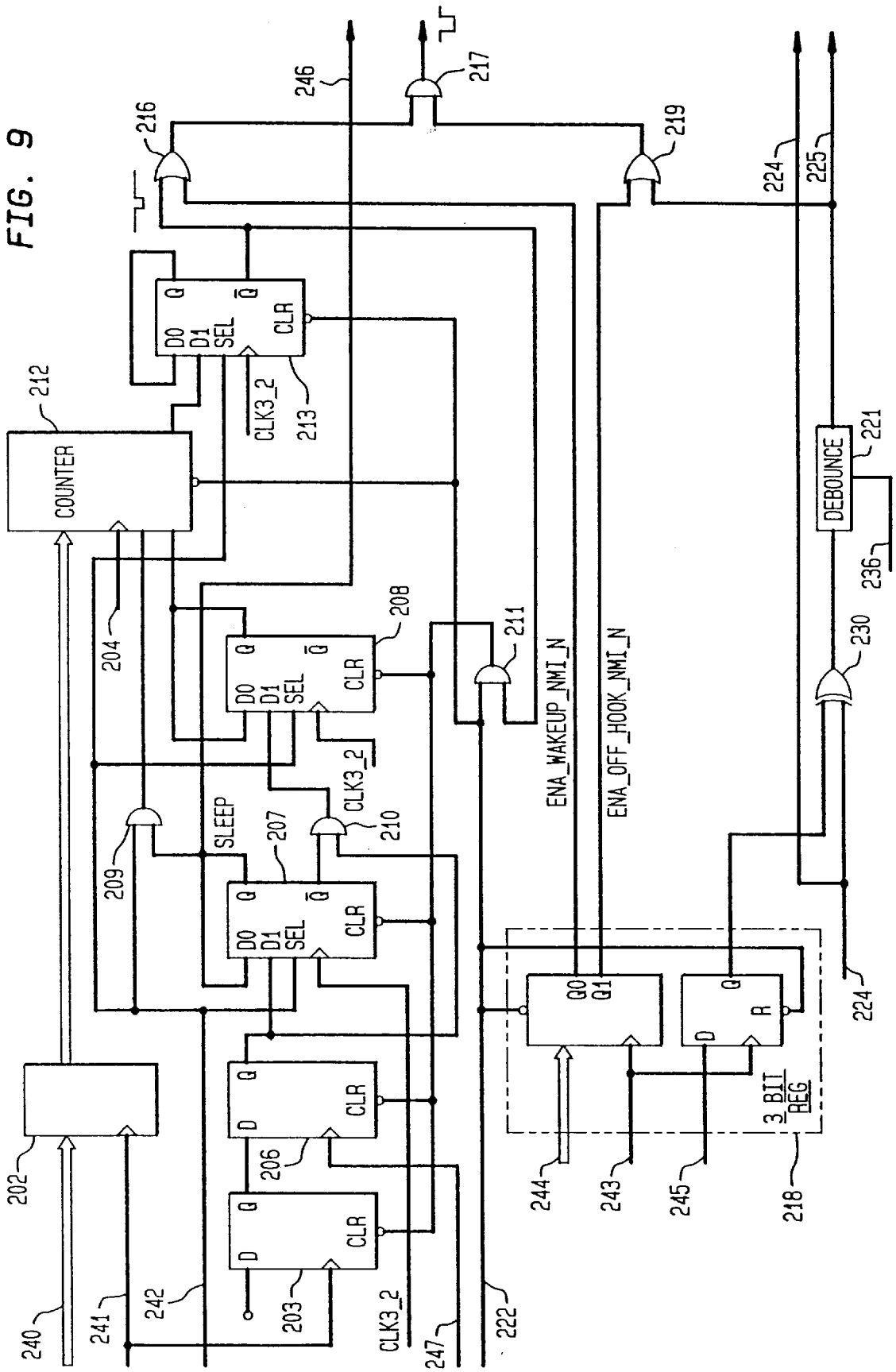
FIG. 9 is a block and line diagram of an idle mode timer and wake-up logic on the DDF ASIC of the subscriber unit in FIG. 1.

FIG. 9 illustrates one form of the idle mode timer and wake-up part of control logic circuits 32 in FIG. 1A. This circuit cooperates with the DSP 19 by timing out a predetermined interval during which the DSP can "sleep" in its powered down mode of operation. It was previously noted that DSP 19 is a commercially available programmable digital signal processor which includes a built-in power down mode which it enters upon execution of an Idle instruction, e.g., at the start of RF-Idle On-hook state 157 in FIG. 6 when the subscriber unit will be in the idle state for at least three successive time slots. At that time the DSP program sends a notice message to Control logic circuits 32 by way of data bus 42 that it is going to sleep, and the message includes a sleep-length data word and a write strobe signal. In the sleep, or idle, mode, the DSP 19 is able to hold, e.g., in RAM 39, its program operating point information needed for restart and to respond to a wake-up interrupt.

The notice message is applied on a bit-parallel circuit 240 to a sleep-length register 202 along with the aforementioned write strobe signal on lead 241 to enable the register to load the message word. That enable signal also starts operation of a series of D-type bistable (i.e., flip-flop) circuits 203, 206, 207, and 208, which cooperate with AND gates 209, 210, and 211, to enable a sleep-length counter 212, to load the value from register 202 and count up from that value. Counter 212 is driven at a high clock rate (illustratively 3.2 MHz) to give the DSP high resolution control of the duration of its sleep interval. A circuit 204 supplies that clock signal for counter 212 and for other circuit components having a clk3_2 input. The aforementioned flip-flops and associated gates synchronize the start of that counting to begin on the first 3.2 MHz clock pulse after a 16 kHz receive, or select, clock pulse on a lead 242 following the loading of the sleep-length word and the start-of-a-time-slot signal on lead 247. When a full-count state is achieved, the counter terminal count output triggers a D-type flip-flop 213; and its inverted output is coupled through an OR gate 216 to one input of an AND gate 217. The inverted output of flip-flop 213 is also coupled back to actuate the AND gate 211, which had been enabled by a power-up reset signal on a lead 222 from a DSP-controlled ASIC register, to reset flip-flops 203, 206, 207, and 208.

Before entering its sleep mode, the DSP 19 also provides a load-enable signal on a lead 243 and a 3-bit word on circuits 244 and 245 to a 3-bit interrupt control register 218. That word, and two OR gates 216 and 219 and the AND gate 217, cooperate to select one or more of, or none of, a wake-up timer interrupt and a hook status interrupt. Information represented by the three bits in register 218 includes an enable for a wake-up interrupt (ENA_WAKEUP_ NMI_N), an enable for an off-hook detected interrupt (ENA_OFF_HOOK_NMI_N), and one bit which determines whether or not to invert a hook-status signal on a lead 224 from SLIC output lead 69 via DSP ASIC 20, e.g., when the DSP is asleep. That invert capability allows use of inverted or noninverted SLIC outputs for flexibility in being able to use different SLIC circuits, and it also offers the flexibility of being able to generate a hook status interrupt in response to either the off-hook or the on-hook condition of the subscriber telephone set. The enable wake-up interrupt signal is coupled through OR gate 216 to the previously mentioned input of AND gate 217. The enable off-hook interrupt signal is coupled through an OR gate 219, to another input of the AND gate 217. The hook status signal from lead 224 is applied to an input of an EX OR gate 230 along with the invert control bit from register 218. That hook status signal is also applied directly as an output of the circuit of FIG. 9, and goes from there directly to a DDF ASIC 20 status register that is readable by the DSP 19. Output of gate 230 is coupled through a debouncing circuit 221 both directly to an output connection 225 of the circuit of FIG. 9 and via OR gate 219 to the gate 217. Debouncing circuit 221 receives on lead 236 a clock signal having a period (illustratively 1.5 ms) comparable to the bounce transient interval of the signal from gate 220. The output of gate 217.is the wake-up interrupt signal, and it is applied back to DSP 19 by way of circuit 52 in FIG. 1. A true output of flip-flop 207 is provided as a sleep status indicator on a lead 246 which is available for reading by the DSP 19 to learn whether or not counter 212 may have been enabled to load the sleep-length word. The aforementioned power-up reset signal on lead 222 enables gate 211 and resets register 218, counter 212, and flip-flop 213.

Figure 10:
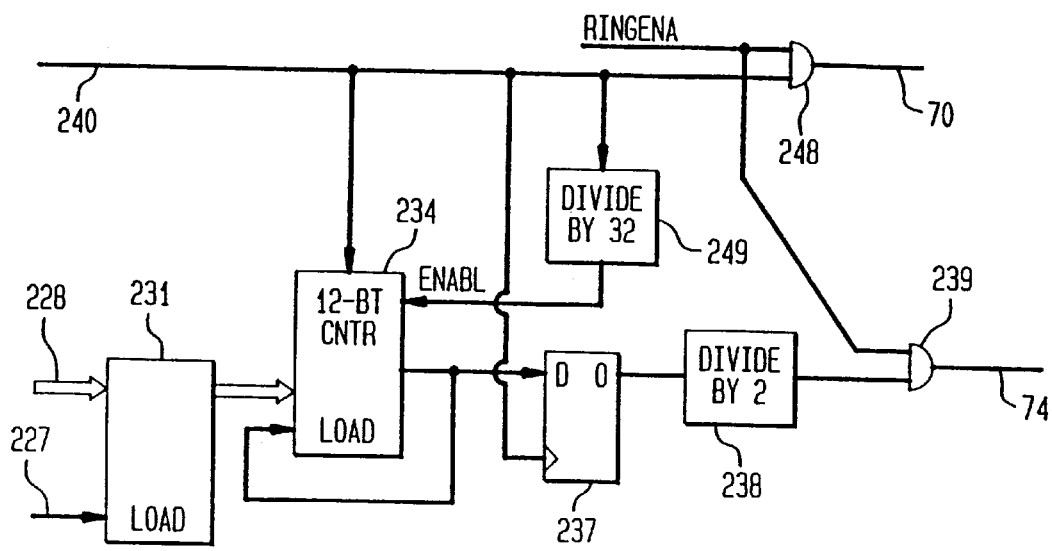
FIG. 10 is a block and line diagram of a circuit for producing two frequencies to be supplied to a ring circuit in FIG. 11.
Figure 11:
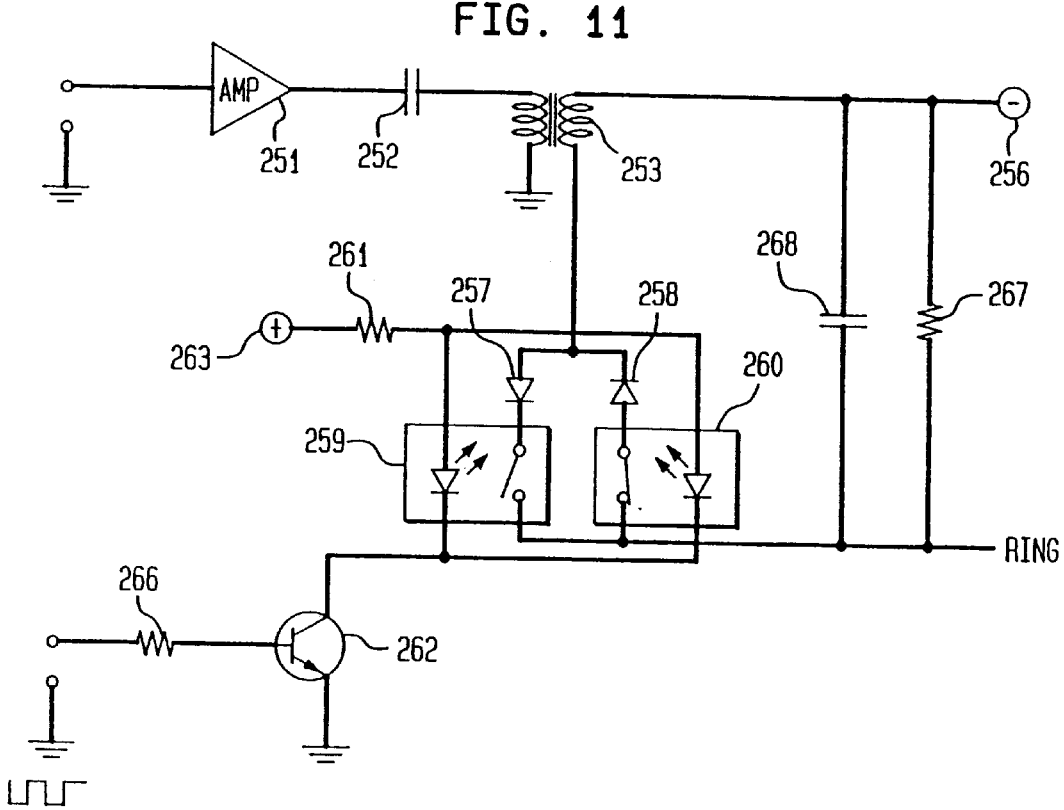
FIG. 11 is a diagram of a prior art ring circuit in the line interface circuit of the subscriber unit in FIG. 1.

FIG. 10 is a part of control logic circuits 32 and is a circuit both for producing high and low frequency signals for controlling a programmable ring circuit in FIG. 11 and for turning those high and low frequency signals an and off, as commanded by a base station, in the ringing function loops in FIG. 6. That is, the base station directs when ringing should start; and it further directs the ring-on and ring-off cadence, illustratively the 2-seconds-on-4-seconds-off cadence mentioned earlier. The DSP 19 then directs control logic circuits 32 when to make its RINGENA signal high for each 2-seconds-on part of that cadence to control the circuit components of FIG. 10 as will now be described.

Illustratively, a twelve-bit register 231 receives a load signal on a lead 227 and a load value on a 12-bit circuit 228, both from the DSP 19. When a 12-bit counter 234 is enabled, by feedback of its output to a load input and by an enable input from a divide-by-32 circuit 249, it samples the value output of register 231. The value in register 231 determines in part the desired ultimate ringing frequency. That value is illustratively determined as follows:

Load value=4096−n, where n=2500/(2*ring frequency). For example, to produce a ring frequency of 20 Hz:

n=2500/(2*20)=62.5

Load value=4096−62.5=4033.5.

Counter 234, when so enabled, counts up from the load value. Clock signals, determined in a manner which will be described, actuate both the counter 234 and a D-type flip-flop 237 which samples the counter terminal count output at its data input. A divide-by-two circuit 238 divides down the output of flip-flop circuit 237 to the desired ringing frequency. Output from divider 238 is applied to one input of an AND gate 239.

A clock signal, at a DSP program selectable high control frequency for the ring circuit in FIG. 11, is provided from clock signals, derived in control logic circuits 32 in FIG. 1A, on a lead 240. This clock signal advantageously has a frequency about three orders of magnitude higher than the ring signal frequency in the output of the divider 238. In an illustrative example, the clock frequency at lead 240 was five volts at 80 kilohertz (kHz) while the ring signal frequency output from divider 238 was five volts at about 20 Hertz.

The clock signal from lead 240 is applied to clock counter 234, and it is also applied to inputs of a divide-by-32 circuit 249 and an AND gate 248. Counter 234 is enabled to count $\frac{1}{32}$nd of the time, i.e., at 2500 Hz, by the output of the divide-by-32 circuit 249. The 80 kHz clock also clocks flip-flop 237 to synchronize the terminal count output of counter 234. A RINGENA signal, from a DSP-controlled ASIC register, enables the AND gates 248 and 239 so each gate produces its respective 80 kHz and 20 Hz output in bursts occurring at the ringing cadence frequency.

Thus, the low frequency ring signal output from gate 239 has a frequency determined by the DSP program as a function of both local requirements where the subscriber unit is to be installed and by the clock frequency applied to lead 240.

FIG. 11 illustrates the prior art ring circuit 58. The purpose of this circuit is to receive two programmable-frequency signals, a ring control signal and a ring frequency signal, at logic signal level (e.g., 5 volts) and develop from them a relatively high voltage (e.g., 100 volts) AC ringing signal. A high frequency, low voltage (e.g., 80_kHz at 5 volts), ring control signal (from gate 248 in FIG. 10) is coupled to the input of an operational amplifier 251 where the signal power is increased. Amplifier 251 consumes substantially more power when driven by the lead 70 80 kHz input signal than it does when that signal is gated off by the RINGENA signal in FIG. 10. The output of the amplifier is AC coupled through a capacitor 252, as a bipolar, low voltage signal, to one terminal of the primary winding of a high frequency step-up transformer 253 which has the other terminal thereof grounded. The use of a high frequency signal and transformer yields a conveniently small footprint for the ring circuit Transformer 253 advantageously steps the signal up in amplitude by a factor of about twenty, and the secondary winding voltage is superimposed on a negative voltage from a supply 256, such as the −48-volt level of the output of converters 9. One terminal of the secondary winding is connected to that −48-volt point; and the other is connected to separate, oppositely poled, rectifier diodes 257 and 258. The diodes are separately coupled by way of one of two photo conducting diode switches, a normally open switch 259 and a normally closed switch 260, respectively, to the ring lead (resistor 63 in FIG. 1A) and then to the subscriber telephone set. Light emitting diodes of the switches 259 and 260 are separately connected in series with a resistor 261 and a PNP transistor 262 collector-emitter path between a positive voltage supply 263 and ground. The ring signal from gate 239 in FIG. 10 is applied through a resistor 266 across the base-emitter junction of transistor 262. When the ring signal is low, transistor 262 is nonconducting, switch 260 is in its normal closed state, and diode 258 conducts. When the ring signal is high, transistor 262 is conducting, switch 259 is illuminated and closes, switch 260 is illuminated and opens, and diode 257 conducts.

A capacitor 268 is connected between the negative voltage supply 256 and the Ring lead to serve as a low pass smoothing filter so the 80 kHz frequency component is shunted back to transformer 253. A resistor 267 is connected to serve as a bleeding resistor for the capacitor. Since the tip lead of the subscriber loop in FIG. 1A is at ground, there appears on the subscriber loop an essentially rectangular ringing signal at the frequency at which transistor 262 is switched by the ring signal from FIG. 10, and at the amplitude established by amplifier 251 and transformer 253. In one embodiment, an 80 kHz 5-volt signal applied to amplifier 251 and a 20 Hz 5-volt signal applied to transistor 262 produced a 20 Hz, 100-volt, AC ringing signal on the loop including the Ring lead in FIG. 11.

The ringing signal output frequency is programmable since it can be changed by changing the load value provided from the DSP 19 in FIG. 1B to the register 231 in FIG. 10. Ringing cadence follows whatever format is programmed into the FIG. 10 RINGENA signal. Ring control signal frequency need only be high enough for efficient operation of the high frequency transformer 253. Since the ring control signal is turned on and off by the RINGENA signal, as described in connection with FIG. 10, the amplifier 251 is powered down during each Off portion of the ringing cadence by virtue of the absence of an input signal in that interval There has been described a system and method for conserving operating power in a subscriber unit for providing communication via a radio link between a subscriber telephone set and a base station which is advantageously coupled to the public switched telephone network. Conservation is achieved in various ways, one being by defining, for each time slot of a TDMA frame in each state of subscriber unit operation, selected subscriber unit circuit components which are not necessary for signal processing in that time slot and powering down those circuit components during each occurrence of that time slot and operating state. Powering down is accomplished in various ways, including by actually switching the circuit power supply on and off, or for CMOS circuit components by controlling their clock supply or their input signal supply, or by removing a circuit component select signal, or by reducing the input signal to a circuit component which consumes substantial power when its input signal is high. In addition, selected operating functions which are performed by relatively high power consuming circuit components are shifted to relatively low power consuming circuit components to enable the high power consuming circuit components to have increased opportunity for powering down.

Figure 12:
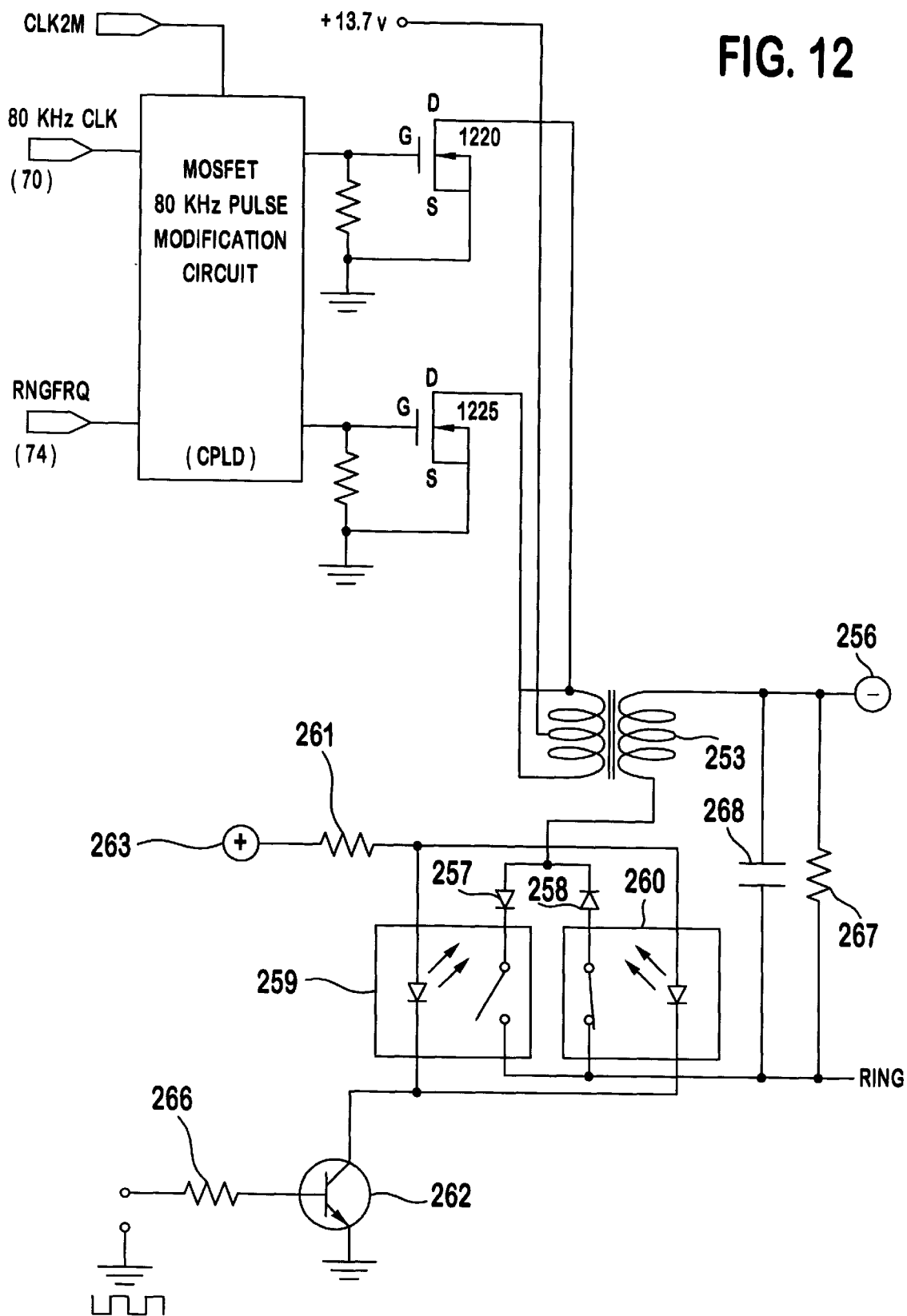
FIG. 12 is a block and line diagram of an alternative embodiment of the ring circuit in the line interface circuit of the subscriber unit in FIG. 1 and of a circuit for producing frequencies to be supplied to that ring circuit.

An alternative circuit for producing frequencies to be supplied to a ring circuit is shown in FIG. 12. As shown in FIG. 12, a complex programmable logic device (CPLD) 1205 is included. This CPLD is a pulse modification circuit which receives as input the signal RNGFRQ (which is received from line 74 in FIG. 10), the signal 80KHZCLK (which is received from line 70 in FIG. 10), and the clock signal CLKZM. The output of CPLD 1205 is transmitted through a plurality of HEXFET transistors (MOSFET resistors) 1220, 1225 and is then received by transformer 253 as shown. Transformer 253 is also coupled to a voltage source (e.g., +13.7 volts). The purpose of HEXFET transistors 1220, 1225 is to act as switches to create a switching waveform for use by the transformer.

In operation, the 80 kHz clock is retimed with the 2 mHz clock to produce two output signals. Two exemplary output signals are shown in FIG. 13. The frequency of the two outputs signals is also 80 kHz. Each of these signals drives HEXFET transistors 1220, 1225 respectively. These signals guarantee that both HEXFET transistors are never "on" at the same time. Although not shown on the waveforms illustrated in FIG. 13, the 80 kHz outpulses are gated off for a small period of time near the ring frequency zero crossings (i.e., where each pulse reaches its lowest level). This is done to create a smaller crest factor (or peak to RMS ratio) on the actual ring waveform.

The effect of gating off the 80 kHz pulses during ring frequency zero crossings is illustrated by FIGS. 14a and 14b. The waveform in FIG. 14a is the ring signal and the waveform in FIG. 14b is RNGFRQ 74. As can be seen from FIG. 14a, the ring signal is close to zero volts for a small period of time near the RNGFRQ 74 zero crossings.

In this alternative embodiment, a large amount of current can be switched with low line resistance. Furthermore, by gating off the outpulses for a small period of time near the ring frequency zero crossings, a waveform which resembles a sine wave is obtained. Thus, by removing the high frequency components of the square wave, crossover between adjacent lines is decreased.

Although the invention has been depicted in terms of a particular illustrative embodiment, other embodiments and modifications which will be apparent to those skilled in the art are included within the scope of the invention.

What is claimed is:

1. A ringing signal generator comprising:

means for registering a data word representing a selectable one of a plurality of predetermined ringing signal frequencies;

means for supplying a clocking signal of a predetermined frequency which is much higher than any of said predetermined ringing signal frequencies;

means, responsive to said data word and said clock signal, for generating a low amplitude signal at said selectable one frequency;

means for amplifying said clock signal to produce an intermediate signal having both positive polarity and negative polarity portions in each frequency cycle;

means for separately half-wave rectifying each of said positive and negative polarity portions;

means, responsive to said low amplitude signal, for alternately sampling said separately rectified positive and negative polarity portions;

means for low pass filtering an output of said sampling means to produce a ringing signal at a larger amplitude and at said selectable one frequency;

means for providing a gating signal of average frequency which is much less than the frequency of said selectable one frequency and having an on-time/off-time duty cycle defining a predetermined ringing signal cadence;

means, responsive to said gating signal on-time, for selectively coupling said clock signal to said amplifying means and selectively coupling said low amplitude signal to said alternately sampling means during only said on-time for thereby periodically powering down said ringing signal generator during said off-time of said gating signal.

2. A ringing signal generator according to claim 1, wherein said intermediate signal has an amplitude larger than the amplitude of said selectable one frequency signal and having a frequency much greater than the frequency of said selectable one frequency.

3. Apparatus for generating a ring signal having a desired frequency, said apparatus comprising:

means, including a counter, for receiving a digital value corresponding to said desired frequency and, responsive thereto, for generating a ring frequency signal having a frequency corresponding to said desired frequency of said ring signal, wherein said ring frequency signal is generated by counting on said counter from said digital value and counting to a fixed value;

means for generating a ring control signal for indicating a cadence of said ring signal; and means for generating said ring signal based on said ring frequency signal and for cycling said ring signal on and off based on said ring control signal.

4. Apparatus of claim 3, further comprising means for applying a clock signal to a) actuate said counter and b) sample an output signal generated by said counter.

5. Apparatus of claim 3, further comprising means for generating one of a plurality of ring signal values and for transmitting said one of said plurality of ring signal values to said means for generating said ring frequency signal as said digital value, wherein each of said ring signal values corresponds to a respective frequency of a plurality of frequencies of said ring signal, and wherein any of said plurality of frequencies is said desired frequency.

6. Apparatus of claim 3, wherein said means for generating said ring signal generates said ring signal at a higher voltage than respective voltages of said ring frequency signal and said ring control signal.

7. Apparatus of claim 3, further comprising means for rectifying said ring frequency signal and for sampling said rectified ring frequency signal based on said ring control signal to generate said ring signal.

8. Apparatus of claim 3, wherein said ring frequency signal includes a plurality of out pulses each separated by a ring frequency zero crossing further comprising means for gating off each of said outpulses adjacent to each ring frequency zero crossing to generate said ring signal with at least three signal levels.

9. Apparatus for generating a ring signal having a desired frequency, said apparatus comprising:

means, for receiving a digital value corresponding to said desired frequency and, responsive thereto, for generating a ring frequency signal having a frequency corresponding to said desired frequency of a ringing signal;

means for generating a ring control signal for indicating a cadence having on portions and off portions of said ring signal;

means for selectively coupling an input signal to an amplifying means only during the on portions of said ring control signal cadence;

said amplifying means for amplifying said selectively coupled input signal;

means for selectively coupling said ring frequency signal to a sampling means only during the on portions of said ring control signal cadence; and said sampling means for sampling said amplified input signal in response to said selectively coupled ring frequency signal to produce said ring signal at said desired frequency.

10. Apparatus for generating a ring signal comprising:

means for generating a ring frequency signal at a desired frequency;

means for receiving said ring frequency signal and combining said ring frequency signal with a ring control signal to generate a first intermediate signal having a plurality of outpulses associated with said ring control signal each separated by a ring frequency zero crossing, wherein each of said outpulses have gated off adjacent to each ring frequency zero crossing;

means for receiving an input signal and sampling said input signal in response to said ring control signal to generate a second intermediate signal having said plurality of outpulses associated with said ring control signal; and means for amplifying said second intermediate signal and sampling said first intermediate signal in response to said second intermediate frequency signal to generate said ring signal having at least three signal levels at said desired frequency.

11. Apparatus for generating a ring signal according to claim 10, wherein said means for generating said ring frequency signal includes means for receiving a digital value corresponding to said desired frequency and, responsive thereto, for generating said rings frequency signal having a frequency corresponding to said desired frequency .

12. Apparatus of claim 11, wherein said means for generating said ring frequency signal includes a counter for counting from said digital value to a fixed value to generate said ring, frequency signal.

13. Apparatus of claim 12, further comprising means for applying a clock signal to a) actuate said counter and b) sample an output signal generated by said counter.

14. Apparatus of claim 11, further comprising means for generating one of a plurality of ring signal values and for transmitting said one of said plurality of ring signal values to said means for generating said ring frequency signal as said digital value, wherein each of said ring signal values corresponds to a respective frequency of a plurality of frequencies of said ring signal, and wherein any of said plurality of frequencies is said desired frequency.

15. Apparatus of claim 10, further comprising means for generating said ring control signal for indicating a cadence of said ring signal, wherein said means for generating said ring signal generates said ring signal at a higher voltage than respective voltages of said ring frequency signal and said ring control signal.

16. Apparatus of claim 15, wherein said amplifying and sampling means further comprises means for rectifying said second intermediate signal and for sampling said rectified second intermediate signal based on said first intermediate signal to generate said ring signal.

17. Apparatus of claim 3 wherein said ring signal generating means comprises:

means for amplifying a clock signal; and means, responsive to said cycled ring frequency signal, for sampling said amplified clock signal to produce said ring signal.

18. Apparatus of claim 17 further comprising:

means for selectively coupling said clock signal to said amplifying means only during on portions of said cadence; and means for selectively coupling, in response to said ring control signal, said ring frequency signal to said sampling means to generate said cycled ring frequency signal.

* * * * *

UNITED STATES PATENT AND TRADEMARK OFFICE
CERTIFICATE OF CORRECTION

PATENT NO.    : 6,243,399 B1  
DATED         : June 5, 2001  
INVENTOR(S)   : Kaewell et al.

Page 1 of 1

It is certified that error appears in the above-identified patent and that said Letters Patent is hereby corrected as shown below:

<u>Column 8,</u>  
Line 36, delete "30".

Signed and Sealed this

Twelfth Day of March, 2002

Attest:

*Attesting Officer*

JAMES E. ROGAN  
*Director of the United States Patent and Trademark Office*